US012647559B2

(12) United States Patent
Mate et al.

(10) Patent No.: US 12,647,559 B2
(45) Date of Patent: Jun. 2, 2026

(54) METHOD, AN APPARATUS AND A COMPUTER PROGRAM PRODUCT FOR HIGH QUALITY REGIONS CHANGE IN OMNIDIRECTIONAL CONVERSATIONAL VIDEO

(71) Applicant: Nokia Technologies Oy, Espoo (FI)

(72) Inventors: Sujeet Shyamsundar Mate, Tampere (FI); Yu You, Tampere (FI); Miska Matias Hannuksela, Tampere (FI); Saba Ahsan, Espoo (FI); Igor Danilo Diego Curcio, Vimercate (IT); Emre Baris Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 4 days.

(21) Appl. No.: 18/555,396

(22) PCT Filed: Feb. 3, 2022

(86) PCT No.: PCT/FI2022/050069
§ 371 (c)(1),
(2) Date: Oct. 13, 2023

(87) PCT Pub. No.: WO2022/219229
PCT Pub. Date: Oct. 20, 2022

(65) Prior Publication Data
US 2024/0195966 A1     Jun. 13, 2024

(30) Foreign Application Priority Data
Apr. 15, 2021     (FI) ..................................... 20215446

(51) Int. Cl.
*H04N 19/119* (2014.01)
*G06T 3/16* (2024.01)
(Continued)

(52) U.S. Cl.
CPC .............. *H04N 19/119* (2014.11); *G06T 3/16* (2024.01); *H04L 12/1831* (2013.01);
(Continued)

(58) Field of Classification Search
CPC .. H04N 19/119; H04N 19/162; H04N 19/167; H04N 19/17
See application file for complete search history.

(56) References Cited

U.S. PATENT DOCUMENTS 10,460,700 B1 * 10/2019 Mendhekar ......... H04L 41/0823
11,711,505 B2     7/2023 Mate et al.
(Continued)

FOREIGN PATENT DOCUMENTS

WO     WO-2018083211 A1 * 5/2018     ......... G02B 27/0093
WO     2020/234373 A1     11/2020
(Continued)

OTHER PUBLICATIONS

"ITT4RT Permanent Document - Requirements, Working Assumptions and Potential Solutions", 3GPP TSG-SA4 Meeting #112e, S4-210200, Agenda: 11.5, Intel, Feb. 1-10, 2021, 77 pages.
(Continued)

*Primary Examiner* — Tat C Chio
(74) *Attorney, Agent, or Firm* — McCarter & English LLP

(57) ABSTRACT
Some embodiments relate to a method comprising receiving by a sender device omnidirectional video content for encoding; obtaining information of a viewport of a receiver device; obtaining information of a margin region outside the viewport; obtaining a margin update threshold parameter defining a threshold region within the margin region; based on the information of the viewport and the margin update threshold parameter determining whether to change the margin region; encoding the omnidirectional video content
(Continued)

within the viewport with a first quality; encoding the omnidirectional video content within the margin region with a quality not higher than the first quality; and encoding the omnidirectional video content outside the viewport and the margin region with a third quality lower than the first quality and the quality of the margin region.

20 Claims, 11 Drawing Sheets

(51) Int. Cl.

| | |
|---|---|
| *H04L 12/18* | (2006.01) |
| *H04N 13/161* | (2018.01) |
| *H04N 19/162* | (2014.01) |
| *H04N 19/167* | (2014.01) |
| *H04N 19/17* | (2014.01) |
| *H04N 21/6587* | (2011.01) |

(52) U.S. Cl.
CPC ......... *H04N 13/161* (2018.05); *H04N 19/162* (2014.11); *H04N 19/167* (2014.11); *H04N 19/17* (2014.11); *H04N 21/6587* (2013.01)

(56) References Cited

U.S. PATENT DOCUMENTS

| | | | |
|---|---|---|---|
| 2019/0310472 A1 | 10/2019 | Schilt et al. | |
| 2020/0007712 A1 | 1/2020 | Ogawa et al. | |
| 2021/0352256 A1* | 11/2021 | Abhishek ............. | H04N 13/194 |

FOREIGN PATENT DOCUMENTS

| | | |
|---|---|---|
| WO | 2021/073940 A1 | 4/2021 |
| WO | 2022/100897 A1 | 5/2022 |

OTHER PUBLICATIONS

"Support for ITT4RT", 3GPP TSG-SA4 Meeting #112e, S4-210201, Intel, Feb. 1-10, 2021, 35 pages.
"High efficiency video coding", Series H: Audiovisual and Multimedia Systems Infrastructure of audiovisual services—Coding of moving video, Recommendation ITU-T H.265, Nov. 2019, 712 pages.
"Information technology—Coded representation of immersive media—Part 2: Omnidirectional media format", ISO/IEC 23090-2, Second edition, Jul. 2021, 12 pages.
"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.
"Information technology—Coding of audio-visual objects—Part 15: Carriage of network abstraction layer (NAL) unit structured video in the ISO base media file format", ISO/IEC 14496-15, 2021, 282 pages.
"Information technology—High efficiency coding and media delivery in heterogeneous environments—Part 2: High efficiency video coding", ISO/IEC 23008-2, Fourth edition, Aug. 2020, 13 pages.
"Information technology—Coding of audio-visual objects—Part 10: Advanced video coding", ISO/IEC 14496-10, Second edition, Oct. 1, 2004, 280 pages.
"3rd Generation Partnership Project; Technical Specification Group Services and System Aspects; IP Multimedia Subsystem (IMS); Multimedia Telephony; Media handling and interaction (Release 17)", 3GPP TS 26.114, V17.0.0, Apr. 2021, pp. 1-468.
"3rd Generation Partnership Project; Technical Specification Group Services and System Aspects; Telepresence using the IP Multimedia Subsystem (IMS); Media Handling and Interaction (Release 16)", 33GPP TS 26.223, V16.3.0, Apr. 2021, pp. 1-41.
"3rd Generation Partnership Project; Technical Specification Group Services and System Aspects; Virtual Reality (VR) profiles for streaming applications (Release 16)", 3GPP TS 26.118, V16.2.0, Jan. 2021, pp. 1-88.
Wang et al., "RTP Payload Format for High Efficiency Video Coding (HEVC)", RFC 7798, Internet Engineering Task Force (IETF), Mar. 2016, pp. 1-86.
Office action received for corresponding Finnish Patent Application No. 20215446, dated Oct. 7, 2021, 9 pages.
"ITT4RT Permanent Document—Requirements, Working Assumptions and Potential Solutions", 3GPP TSG SA WG4 Meeting #113e, S4-210540, Agenda: 12.5, Nokia Corporation, Apr. 6-14, 2021, 85 pages.
Zou et al., "Probabilistic Tile Visibility-Based Server-Side Rate Adaptation for Adaptive 360-Degree Video Streaming", IEEE Journal of Selected Topics in Signal Processing, vol. 14, No. 1, Jan. 2020, pp. 161-176.
International Search Report and Written Opinion received for corresponding Patent Cooperation Treaty Application No. PCT/FI2022/050069, dated Apr. 27, 2022, 17 pages.
"Draft Report for MTSI SWG Apr. 17, 2020 Teleconference #4 on ITT4RT", 3GPP SA4 #109-e Meeting, Tdoc S4-200739, Agenda: 5.1, SA4 MTSI SWG Chairman', May 20-Jun. 3, 2020, 12 pages.
"ITT4RT Draft CR 26.114 on Phase 2 Features", 3GPP TSG SA WG4 Meeting #113e, S4-210549, Nokia Corporation, Feb. 1-10, 2021, 17 pages.
"ITT4RT Permanent Document—Requirements, Working Assumptions and Potential Solutions", 3GPP TSG-SA4 Meeting #110e, S4-201194, Agenda: 11.5, Intel, Aug. 19-28, 2020, 65 pages.
"Viewport feedback trigger", 3GPP TSG SA WG 4 meeting #114-e, S4-210817, Nokia Corporation, May 19-28, 2021, pp. 1-5.

* cited by examiner

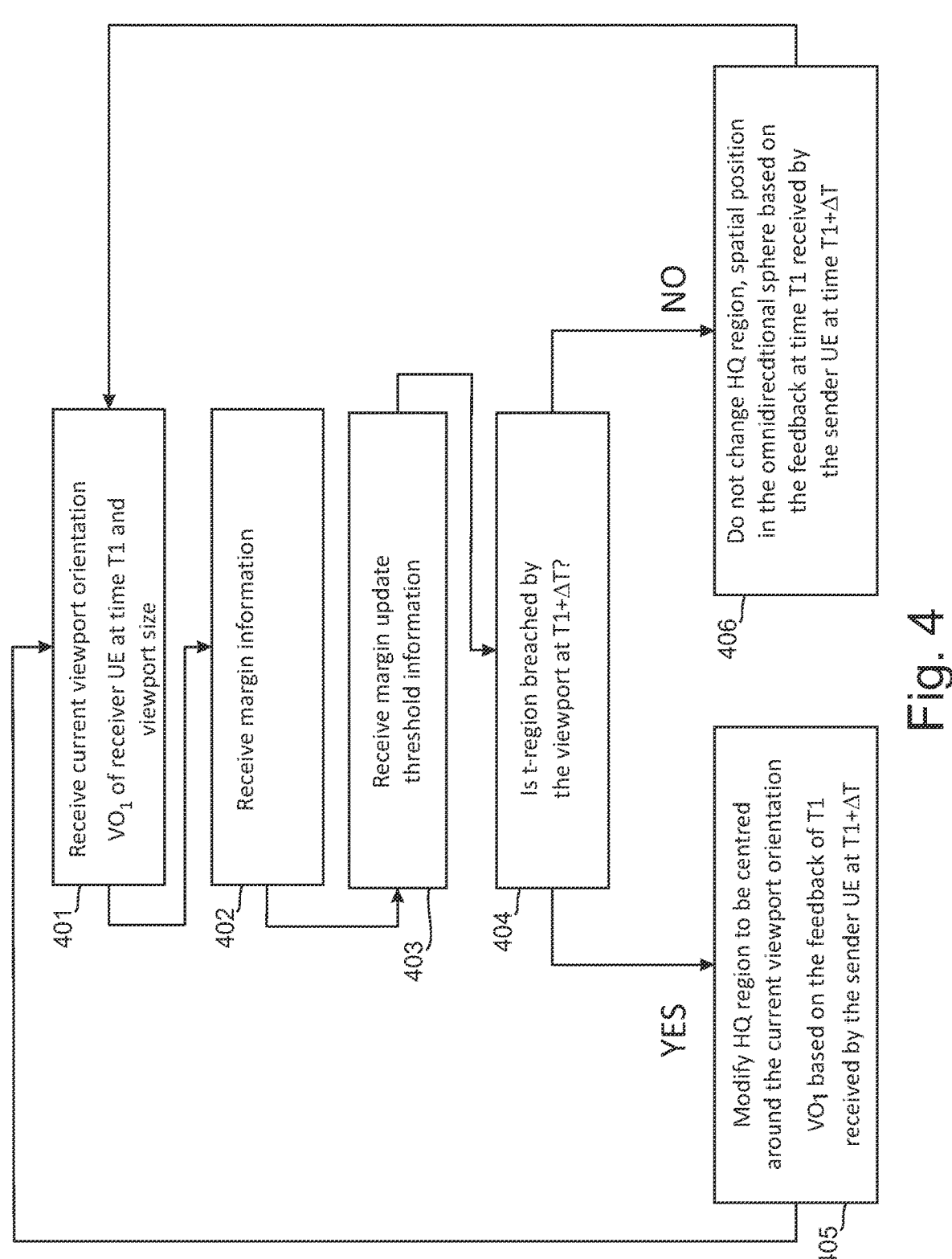

401  Receive current viewport orientation VO₁ of receiver UE at time T1 and viewport size 402  Receive margin information 403  Receive margin update threshold information 404  Is t-region breached by the viewport at T1+ΔT?

405  YES  Modify HQ region to be centred around the current viewport orientation VO₁ based on the feedback of T1 received by the sender UE at T1+ΔT 406  NO  Do not change HQ region, spatial position in the omnidirecdtional sphere based on the feedback at time T1 received by the sender UE at time T1+ΔT

Fig. 4

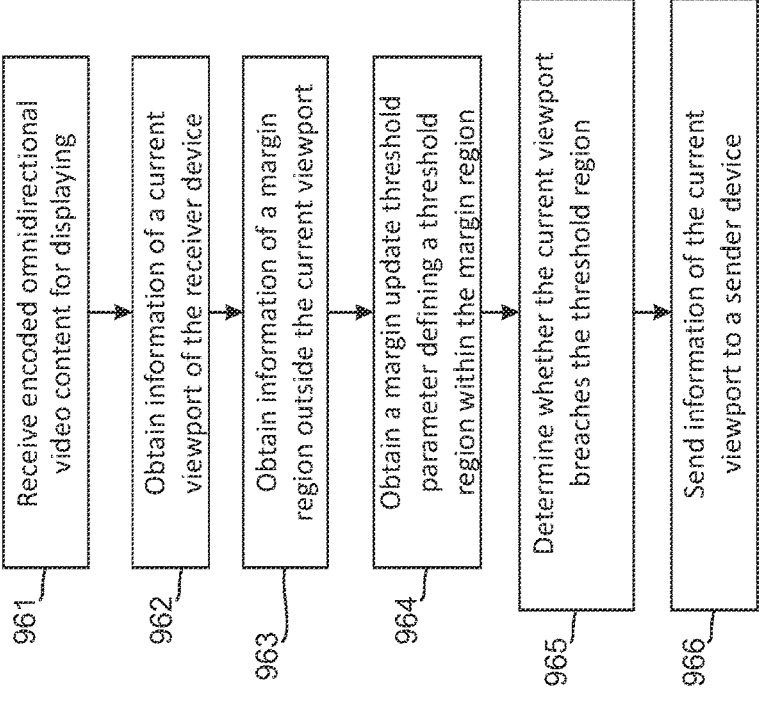

961 Receive encoded omnidirectional video content for displaying

962 Obtain information of a current viewport of the receiver device

963 Obtain information of a margin region outside the current viewport

964 Obtain a margin update threshold parameter defining a threshold region within the margin region 965 Determine whether the current viewport breaches the threshold region 966 Send information of the current viewport to a sender device

Fig. 9b

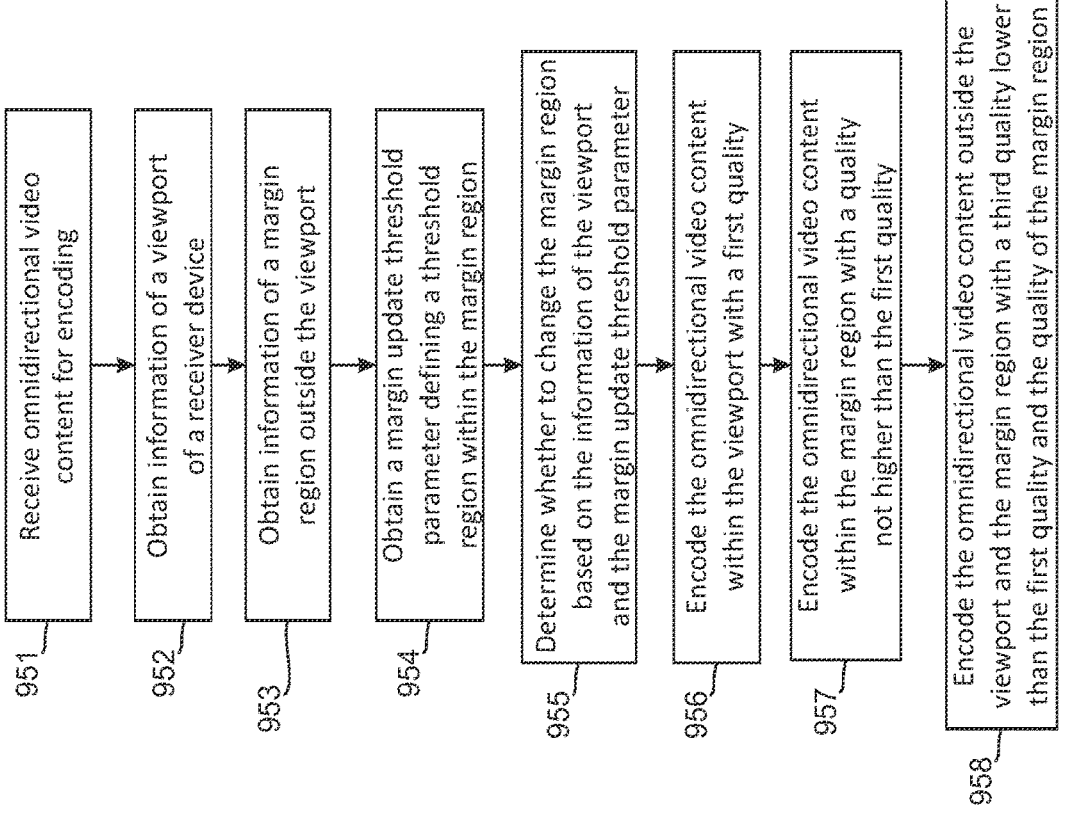

951 Receive omnidirectional video content for encoding

952 Obtain information of a viewport of a receiver device

953 Obtain information of a margin region outside the viewport

954 Obtain a margin update threshold parameter defining a threshold region within the margin region 955 Determine whether to change the margin region based on the information of the viewport and the margin update threshold parameter 956 Encode the omnidirectional video content within the viewport with a first quality 957 Encode the omnidirectional video content within the margin region with a quality not higher than the first quality 958 Encode the omnidirectional video content outside the viewport and the margin region with a third quality lower than the first quality and the quality of the margin region

Fig. 9a

METHOD, AN APPARATUS AND A COMPUTER PROGRAM PRODUCT FOR HIGH QUALITY REGIONS CHANGE IN OMNIDIRECTIONAL CONVERSATIONAL VIDEO

RELATED APPLICATION

This application was originally filed as PCT Application No. PCT/FI2022/050069, filed on Feb. 3, 2022, which claims priority from FI application No. 20215446, filed on Apr. 15, 2021, each of which is incorporated herein by reference in its entirety.

TECHNICAL FIELD

The present solution generally relates to video encoding and/or transmission and video decoding and/or reception.

BACKGROUND

Devices that are able to capture image and video have evolved from devices capturing a limited angular field of view to devices capturing 360-degree content. These devices are able to capture visual and audio content all around them, i.e. they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is the entire sphere, is commonly referred to as virtual reality (VR) or omnidirectional video.

Third Generation Partnership Project (3GPP) Immersive Teleconferencing and Telepresence for Remote Terminals (ITT4RT) relates to omnidirectional video delivery in covering point to point and multiparty conversational applications. Viewport dependent delivery is a method to improve efficiency by reducing the bit rate of the content which is unwatched because it is outside of a user's viewport. Viewport dependent delivery is being standardized for conversational omnidirectional video content in 3GPP SA4 within the ITT4RT work item. In order to reduce data wastage, a subset of the omnidirectional video may be delivered from a sender to a receiver at a higher quality, which covers the expected viewport orientation. Due to a delay in responding to a change in viewport orientation at the receiver, a region greater than a current viewport is delivered at a higher quality. This is expected to reduce the probability of a low quality video in the viewport.

Areas outside the viewer's viewport may be called as margins. Margins can be extended on all or some sides of the viewport and may be at the same quality (or resolution) as the viewport or at a quality (or resolution) lower than the viewport but higher than the background. Area and an area outside the viewport and the margins may be called as a background or a background area. The quality of the image (e.g. resolution) may be higher in the viewport region than in the area outside the viewport and the margins. Hence, the term high quality used in this disclosure means an image quality which is higher than image quality in the background.

Currently it is not appropriately specified how a sender device of a conversational omnidirectional video will respond to a change in viewport orientation information obtained from a receiver device. Furthermore, it is not clear how the change in a high quality (HQ) region is performed based on margins specified.

The uncertainty in the expected behavior may result in poor or inconsistent experience. For a specified margin, the sender may respond too late in encoding HQ region with margins resulting in low quality content being part of the viewport (due to the change in viewport orientation by the user) or the sender may respond too soon resulting in perpetual HQ region change which might adversely impact coding performance as well as result in additional computational load on the sender device.

SUMMARY

Some embodiments of the disclosure provide a method for high quality region update in case of viewport dependent delivery of omnidirectional video. There is provided a basic margin which describes a region associated with the omnidirectional video which is delivered at a higher quality than the background. Thus, the basic margin may provide a zone of consistent viewport quality despite motions of a head of a viewer or changes of the viewport.

In addition to the use of viewport and margins, there is also provided a spatial parameter which may be called as a margin_update_threshold parameter. This parameter describes a spatial threshold for the sender device (a sender user equipment, a sender UE) to perform a change in high quality region encoding.

The margin_update_threshold parameter may result in avoidance of continuous change in the high quality region encoding depending on a change in viewport orientation. Furthermore, this approach incorporates a safety threshold (to viewport change) to reduce the probability or risk of degrading the viewport quality.

The margin_update_threshold parameter can be negotiated as a session attribute or included as a real-time control protocol (RTCP) feedback parameter.

In another embodiment of the disclosure, the margin_update_threshold parameter can also have an associated viewport_change_rate parameter to enable the sender UE to adapt the change in HQ region change to occur sooner than breaching the margin. For example, there can be multiple margin_update_threshold parameters which react to different viewport_change_rate parameters.

As a yet another embodiment of the disclosure, the margin_update_threshold parameter can be signaled by a receiver device (a receiver user equipment, a receiver UE) in addition to a current viewport orientation using an RTCP feedback message. This may allow the sender UE to determine which RTCP feedback message necessitates change in HQ region, according to a receiver UE preference.

If the value of the margin_update_threshold parameter is equal to a viewport size, it may result in continuous HQ region update which is analogous to viewport-locked VDD in which a sender UE only sends the viewport content which is centered to the center of the viewport, whereas for a margin_update_threshold value equal to the margin, change in HQ region is delayed until an edge of the viewport region reaches an edge of the margin or even exceeds the margin. This situation can also be expressed so that the viewport breaches the margin.

In another embodiment of the disclosure, the viewport margin_update_threshold and margins may have different correlated values with respect to the viewport motion direction and speed. The viewport margin on the side of the viewport in the direction of the movement can be greater than the viewport margin on the other side of the viewport movement direction.

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising:

receiving by a sender device omnidirectional video content for encoding;

obtaining information of a viewport of a receiver device;

obtaining information of a margin region outside the viewport;

obtaining a margin update threshold parameter defining a threshold region within the margin region;

based on the information of the viewport and the margin update threshold parameter determining whether to change the margin region;

encoding the omnidirectional video content within the viewport with a first quality;

encoding the omnidirectional video content within the margin region with a quality not higher than the first quality; and encoding the omnidirectional video content outside the viewport and the margin region with a third quality lower than the first quality and the quality of the margin region.

According to a second aspect, there is provided an apparatus comprising means for:

receiving omnidirectional video content for encoding;

obtaining information of a viewport of a receiver device;

obtaining information of a margin region outside the viewport;

obtaining a margin update threshold parameter defining a threshold region within the margin region;

based on the information of the viewport and the margin update threshold parameter determining whether to change the margin region;

encoding the omnidirectional video content within the viewport with a first quality;

encoding the omnidirectional video content within the margin region with a quality not higher than the first quality; and encoding the omnidirectional video content outside the viewport and the margin region with a third quality lower than the first quality and the quality of the margin region.

According to a third aspect there is provided an apparatus comprising at least one processor; and at least one memory including computer program code the at least one memory and the computer program code configured to, with the at least one processor, cause the apparatus to perform at least the following:

receive omnidirectional video content for encoding;

obtain information of a viewport of a receiver device;

obtain information of a margin region outside the viewport;

obtain a margin update threshold parameter defining a threshold region within the margin region;

based on the information of the viewport and the margin update threshold parameter determine whether to change the margin region;

encode the omnidirectional video content within the viewport with a first quality;

encode the omnidirectional video content within the margin region with a quality not higher than the first quality; and encode the omnidirectional video content outside the viewport and the margin region with a third quality lower than the first quality and the quality of the margin region.

According to a fourth aspect there is provided a computer program comprising computer readable program code which, when executed by at least one processor; cause the apparatus or system to perform at least the following:

receive omnidirectional video content for encoding;

obtain information of a viewport of a receiver device;

obtain information of a margin region outside the viewport;

obtain a margin update threshold parameter defining a threshold region within the margin region;

based on the information of the viewport and the margin update threshold parameter determine whether to change the margin region;

encode the omnidirectional video content within the viewport with a first quality;

encode the omnidirectional video content within the margin region with a quality not higher than the first quality; and encode the omnidirectional video content outside the viewport and the margin region with a third quality lower than the first quality and the quality of the margin region.

According to a fifth aspect, there is provided a method comprising:

receiving by a receiver device encoded omnidirectional video content for displaying, wherein the encoded omnidirectional video content comprises a viewport region encoded with a first quality, a margin region outside the first region encoded with a quality not higher than the first quality and a background region outside the margin region encoded with a quality lower than the first quality and the quality of the margin region;

obtaining information of a current viewport of the receiver device;

obtaining information of a margin region outside the current viewport;

obtaining a margin update threshold parameter defining a threshold region within the margin region;

determining whether the current viewport breaches the threshold region;

based on the determining sending information of the current viewport to a sender device.

According to a sixth aspect, there is provided an apparatus comprising means for:

receiving encoded omnidirectional video content for displaying, wherein the encoded omnidirectional video content comprises a viewport region encoded with a first quality, a margin region outside the first region encoded with a quality not higher than the first quality and a background region outside the margin region encoded with a quality lower than the first quality and the quality of the margin region;

obtaining information of a current viewport of the apparatus;

obtaining information of a margin region outside the current viewport;

obtaining a margin update threshold parameter defining a threshold region within the margin region;

determining whether the current viewport breaches the threshold region;

based on the determining sending information of the current viewport to a sender device.

According to a seventh aspect there is provided an apparatus comprising at least one processor; and at least one memory including computer program code the at least one memory and the computer program code configured to, with the at least one processor, cause the apparatus to perform at least the following:

receive encoded omnidirectional video content for displaying, wherein the encoded omnidirectional video content comprises a viewport region encoded with a first quality, a margin region outside the first region encoded with a quality not higher than the first quality and a background region outside the margin region encoded with a quality lower than the first quality and the quality of the margin region;

obtain information of a current viewport of the apparatus;

obtain information of a margin region outside the current viewport;

obtain a margin update threshold parameter defining a threshold region within the margin region;

determine whether the current viewport breaches the threshold region;

based on the determining send information of the current viewport to a sender device.

According to an eighth aspect there is provided a computer program comprising computer readable program code which, when executed by at least one processor; cause the apparatus or system to perform at least the following:

receive encoded omnidirectional video content for displaying, wherein the encoded omnidirectional video content comprises a viewport region encoded with a first quality, a margin region outside the first region encoded with a quality not higher than the first quality and a background region outside the margin region encoded with a quality lower than the first quality and the quality of the margin region;

obtain information of a current viewport of the apparatus or system;

obtain information of a margin region outside the current viewport;

obtain a margin update threshold parameter defining a threshold region within the margin region;

determine whether the current viewport breaches the threshold region;

based on the determining send information of the current viewport to a sender device.

DESCRIPTION OF THE DRAWINGS

In the following, various embodiments will be described in more detail with reference to the appended drawings, in which

FIG. 4 presents a flow diagram of operation of a sender device related to a margin update threshold, in accordance with an embodiment of the disclosure;

FIG. 9*a* presents a flow diagram of operation of a sender device according to an embodiment; and FIG. 9*b* presents a flow diagram of operation of a receiver device according to an embodiment.

DESCRIPTION OF EXAMPLE EMBODIMENTS

Figure 1:
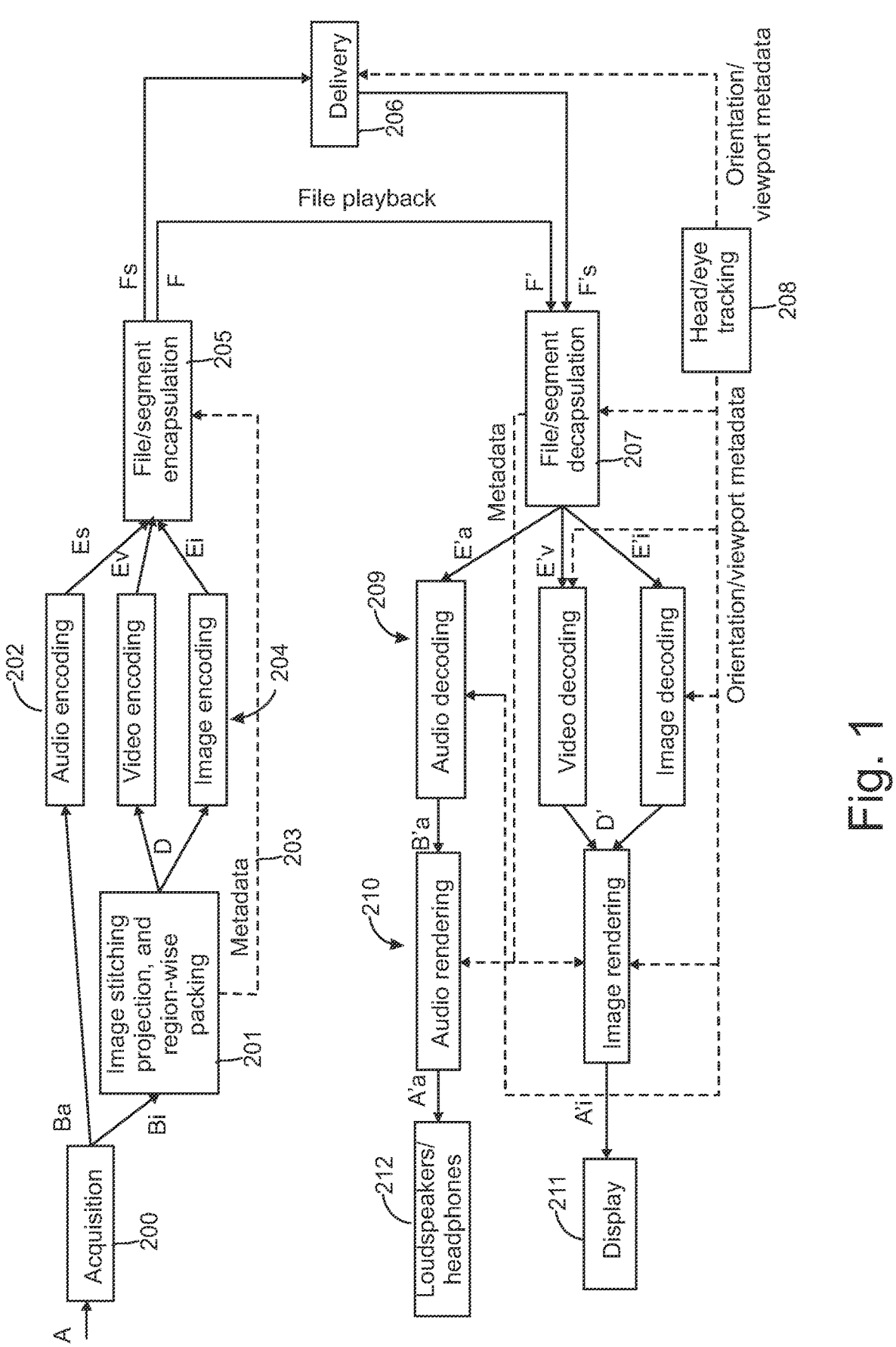
FIG. 1 shows an example of an OMAF end-to-end system.

In the following, several embodiments of the disclosure will be described in the context of one video coding arrangement. It is to be noted that different embodiments may have applications widely in any environment where improvement of viewport dependent delivery of omnidirectional video is desired. For example, some embodiments may be applicable to video coding systems like streaming systems, DVD players, digital television receivers, personal video recorders, systems and computer programs on personal computers, handheld computers and communication devices, as well as network elements such as transcoders and cloud computing arrangements where video data is handled.

In the following, term "omnidirectional" may refer to media content that may have greater spatial extent than a field-of-view of a device rendering the content. Omnidirectional content may, for example, cover substantially 360 degrees in the horizontal dimension and substantially 180 degrees in the vertical dimension, but omnidirectional may also refer to content covering less than 360 degree view in the horizontal direction and/or 180 degree view in the vertical direction.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3 DoF (3 Degrees of Freedom) content (where the viewer is located at the centre of a unit sphere and has three degrees of freedom (Yaw-Pitch-Roll). The following phase standardization (MPEG-I Phase 1b) enables multiple 3 DoF and 3 DoF+ content consumption with user interaction and means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV).

The 360-degree space may be divided into a discrete set of viewports, each separated by a given distance (e.g., expressed in degrees), so that the omnidirectional space can be imagined as a map of overlapping viewports, and the viewport is switched discretely as the user changes his/her orientation while watching content with a head-mounted display (HMD). When the overlapping between viewports is reduced to zero, the viewports can be imagined as adjacent non-overlapping tiles within the 360-degrees space. The H.265 video codec implements the concept of tiles which may be used to realize this scenario (both overlapping and not).

Figures 3A, 3B:
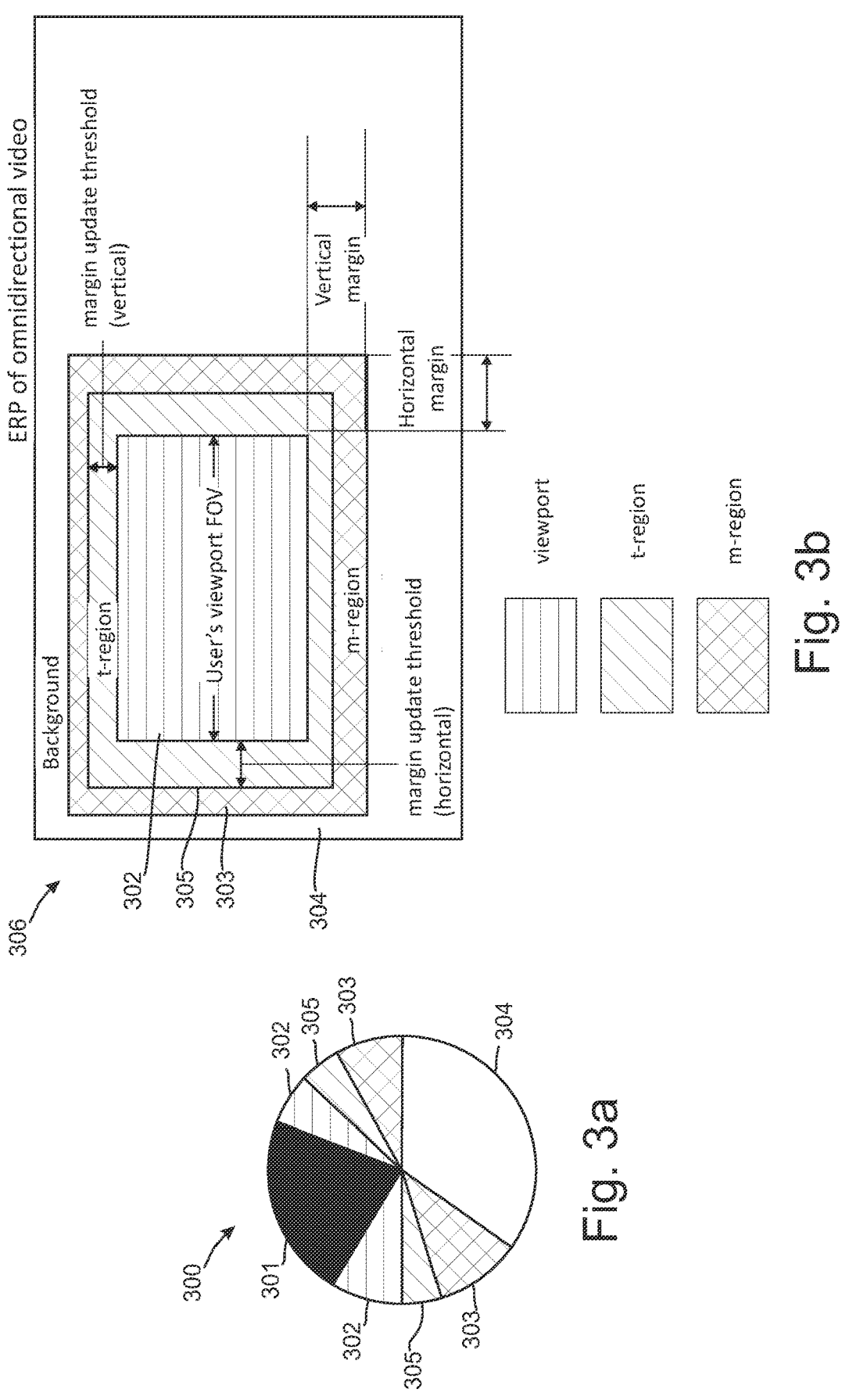
FIG. 3*a* presents an example of a 360° sphere from top divided into a viewport, margins and background areas.
FIG. 3*b* shows an example of an equirectangular picture with a viewport, margins and a margin update threshold, in accordance with an example of the disclosure.

Viewport dependency can be achieved by having at least two quality areas: foreground (content in the current viewport) and background (i.e. content outside the current viewport in 360-degree video), and also a margin around the viewport in which the quality may be the same than in the viewport or lower than that but higher than the quality of the background. It needs to be understood that embodiments are not limited to two or three categories of quality areas but apply generally to any number of categories of quality areas. FIG. 3a illustrates a 360-degree sphere 300 from top. The black area 301 and the horizontally hashed area 302 represent the content corresponding the current viewport, wherein the hashed area 302 of FIG. 3a represents the margin due to viewport not matching with tile boundaries in case of tiles. However, there need not always be tiles. The cross-hatched area 303 represents the margins with possibly the same or lower quality than viewport, and the white area 304 represents the background area, with further lower video quality, hence occupying the least bandwidth. The diagonally hatched area 305 illustrates a margin update threshold region, which will be explained later in this disclosure.

When streaming VR video, a subset of 360-degree video content covering the viewport (i.e., the current view orientation) may be transmitted at the best quality/resolution, while the remaining of 360-degree video may be transmitted at a lower quality/resolution. This is what characterizes a VDS system, as opposed to a Viewport Independent Streaming system, where the omnidirectional video is streamed at high quality in all directions.

The Omnidirectional Media Format (OMAF) standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be among the following: A recommended viewport per the director's cut, e.g., a viewport suggested according to the creative intent of the content author or content provider.

FIG. 1 illustrates the OMAF system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over network.

The omnidirectional media comprises image data (Bi) and audio data (Ba), which are processed separately. In image stitching, rotation, projection and region-wise packing, the images/video of the source media and provided as input (Bi) are stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent pictures on one projected picture. Rectangular region-wise packing can then be applied to obtain a packed picture from the projected picture. The packed pictures (D) are then provided for video and image encoding to result in encoded image (Ei) and/or encoded video stream (Ev). The audio of the source media is provided as input (Ba) to audio encoding that provides as an encoded audio (Ea). The encoded data (Ei, Ev, Ea) are then encapsulated into file for playback (F) and delivery (i.e. streaming) (Fs).

A real-world audio-visual scene (A) may be captured 200 by audio sensors as well as a set of cameras or a camera device with multiple lenses and sensors. The acquisition results in a set of digital image/video (Bi) and audio (Ba) signals. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals may conform to one of the loudspeaker layouts defined in CICP (Coding-Independent Code-Points). In an omnidirectional media application, the loudspeaker layout signals of the rendered immersive audio program may be binauralized for presentation via headphones.

The images (Bi) of the same time instance are stitched, projected, and mapped 201 onto a packed picture (D).

For monoscopic 360-degree video, the input images of one time instance may be stitched to generate a projected picture representing one view. An example of image stitching, projection, and region-wise packing process for monoscopic content is illustrated with FIG. 2a. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected picture. There may be a pre-defined set of representation formats of the projected picture, including for example an equirectangular projection (ERP) format and a cube map projection (CMP) format. It may be considered that the projected picture covers the entire sphere.

Optionally, a region-wise packing is then applied to map the projected picture (C) onto a packed picture (D). If the region-wise packing is not applied, the packed picture is identical to the projected picture, and this picture is given as input to image/video encoding. Otherwise, regions of the projected picture (C) are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

Figures 2A, 2B:
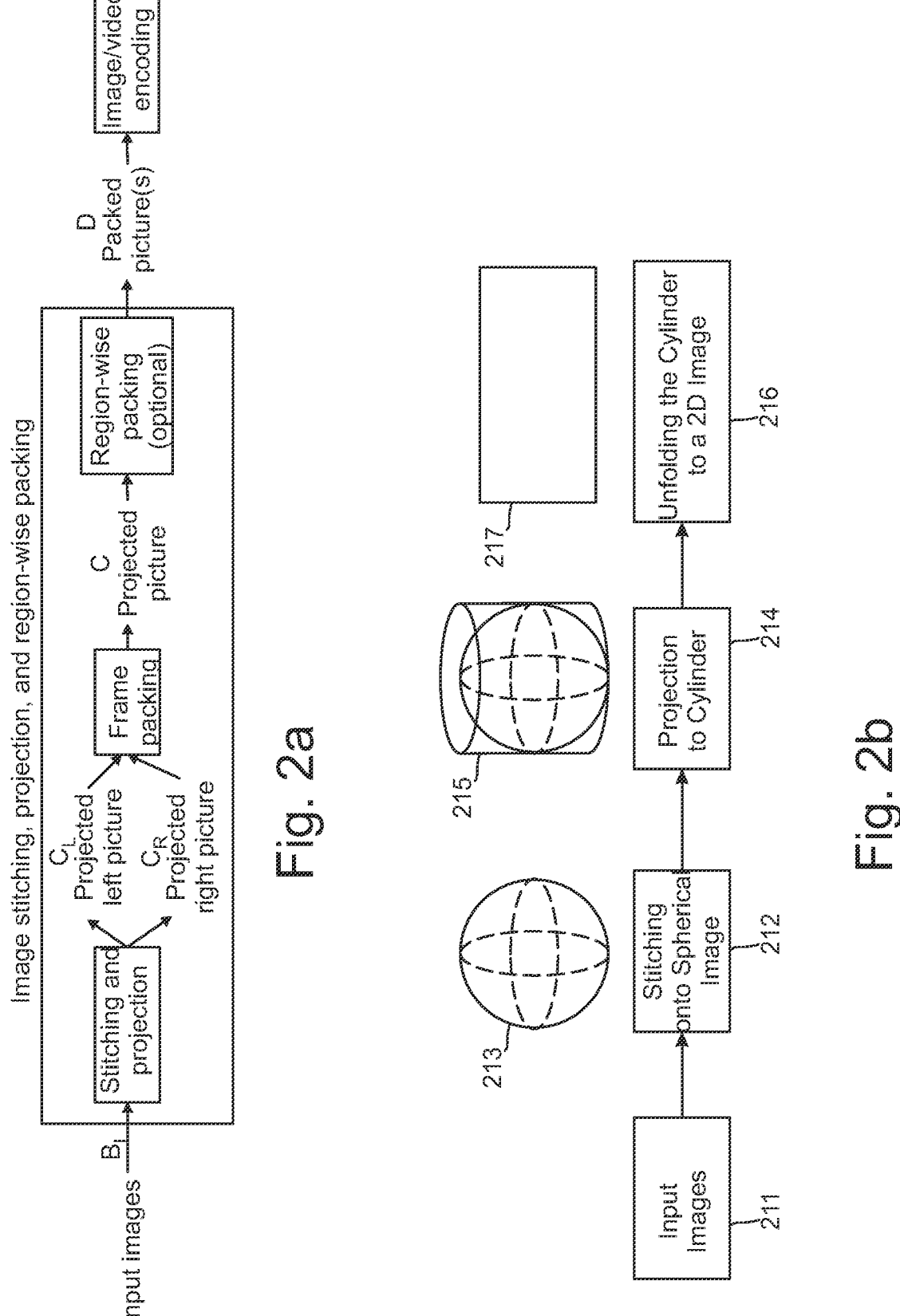
FIG. 2*a* shows an example of image stitching, projection and region-wise packing.
FIG. 2*b* shows an example of a process of forming a monoscopic equirectangular panorama picture.

In the case of stereoscopic 360-degree video, as shown in an example of FIG. 2a, the input images of one time instance are stitched to generate a projected picture representing two views (CL, CR), one for each eye. Both views (CL, CR) can be mapped onto the same packed picture (D) and encoded by a traditional 2D video encoder. Alternatively, each view of the projected picture can be mapped to its own packed picture, in which case the image stitching, projection, and region-wise packing is performed as illustrated in FIG. 2a. A sequence of packed pictures of either the left view or the right view can be independently coded or, when using a multiview video encoder, predicted from the other view.

An example of image stitching, projection, and region-wise packing process for stereoscopic content where both views are mapped onto the same packed picture, as shown in FIG. 1 is described next in more detailed manner. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

360-degree panoramic content (i.e., images and video) cover horizontally (up to) the full 360-degree field-of-view around the capturing position of an imaging device. The vertical field-of-view may vary and can be e.g. 180 degrees.

Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases panoramic content may have less than 360-degree horizontal field-of-view and up to 180-degree vertical field-of-view, while otherwise have the characteristics of equirectangular projection format.

An example of the process of forming a monoscopic equirectangular panorama picture is illustrated in FIG. 2b. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected picture. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

In 360-degree systems, a coordinate system may be defined through orthogonal coordinate axes, such as X (lateral), Y (vertical, pointing upwards), and Z (back-to-front axis, pointing outwards). Rotations around the axes may be defined and may be referred to as yaw, pitch, and roll. Yaw may be defined to rotate around the Y axis, pitch around the X axis, and roll around the Z axis. Rotations may be defined to be extrinsic, i.e., around the X, Y, and Z fixed reference axes. The angles may be defined to increase clockwise when looking from the origin towards the positive end of an axis. The coordinate system specified can be used for defining the sphere coordinates, which may be referred to azimuth ($\phi$) and elevation ($\theta$).

Referring again to FIG. 1, the OMAF allows the omission of image stitching, projection, and region-wise packing and encode the image/video data in their captured format. In this case, images (D) are considered the same as images (Bi) and a limited number of fisheye images per time instance are encoded.

For audio, the stitching process is not needed, since the captured signals are inherently immersive and omnidirectional.

The stitched images (D) are encoded 204 as coded images (Ei) or a coded video bitstream (Ev). The captured audio (Ba) is encoded 202 as an audio bitstream (Ea). The coded images, video, and/or audio are then composed 205 into a media file for file playback (F) or a sequence of an initialization segment and media segments for streaming (Fs), according to a particular media container file format. In this specification, the media container file format is the ISO base media file format. The file encapsulator 205 also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed picture format, e.g. from a projected picture to a packed picture, as described earlier. The region-wise mapping information may for example comprise for each mapped region a source rectangle (a.k.a. projected region) in the projected picture and a destination rectangle (a.k.a. packed region) in the packed picture, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

The segments (Fs) may be delivered 206 using a delivery mechanism to a player.

The file that the file encapsulator outputs (F) is identical to the file that the file decapsulator inputs (F'). A file decapsulator 207 processes the file (F') or the received segments (F's) and extracts the coded bitstreams (E'a, E'v, and/or E'i) and parses the metadata. The audio, video, and/or images are then decoded 208 into decoded signals (B'a for audio, and D' for images/video). The decoded packed pictures (D') are projected 210 onto the screen of a head-mounted display or any other display device 211 based on the current viewing orientation or viewport and the projection, spherical coverage, projection structure orientation, and region-wise packing metadata parsed from the file.

Likewise, decoded audio (B'a) is rendered 210, e.g. through headphones 212, according to the current viewing orientation. The current viewing orientation is determined by the head tracking and possibly also eye tracking functionality 208. Besides being used by the renderer 210 to render the appropriate part of decoded video and audio signals, the current viewing orientation may also be used the video and audio decoders 209 for decoding optimization.

The process described above is applicable to both live and on-demand use cases.

At any point of time, a video rendered by an application on a HMD or on another display device renders a portion of the 360-degree video. This portion may be defined as a viewport. A viewport may be understood as a window on the 360-degree world represented in the omnidirectional video displayed via a rendering display.

According to another definition, a viewport may be defined as a part of the spherical video that is currently displayed. A viewport may be characterized by horizontal and vertical field-of-views (FOV or FoV).

A viewport may further be defined as a region of omnidirectional image or video suitable for display and viewing by the user. A current viewport (which may be sometimes referred simply as a viewport) may be defined as the part of the spherical video that is currently displayed and hence is viewable by the user(s) i.e. the point or space from which the user views the scene; it usually corresponds to a camera position. Slight head motion may not imply a different viewpoint. A viewing position may be defined as the position within a viewing space from which the user views the scene. A viewing space may be defined as a 3D space of viewing positions within which rendering of image and video is enabled and VR experience is valid.

The phrase along the bitstream (e.g. indicating along the bitstream) may be defined to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. For example, an indication along the bitstream may refer to metadata in a container file that encapsulates the bitstream.

Available media file format standards include International Standards Organization (ISO) Base Media File Format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which the embodiments may be implemented. The aspects of the invention are not limited to ISOBMFF, but rather the description is given for one possible basis on top of which the embodiments of the disclosure may be partly or fully realized. The embodiments of the present disclosure may also be implemented using other transport protocols, such as the Real-Time Transport Protocol (RTP) as described below. In general, the information transmitted to implement this invention can be transmitted using any protocol and any layers of the ISO (International Standardization Organization) OSI (Open Systems Interconnection) protocol stack.

High Efficiency Image File Format (HEIF) is a standard developed by the Moving Picture Experts Group (MPEG)

for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), wherein each may contain a few seconds of multimedia data. A Cluster comprises BlockGroup elements, which in turn comprise Block Elements. A Cues Element comprises metadata which may assist in random access or seeking and may include file pointers or respective timestamps for seek points.

A transmission channel or a communication channel or a channel may refer to either a physical transmission medium, such as a wire, or to a logical connection over a multiplexed medium.

Real-time transfer protocol (RTP) is widely used for real-time transport of timed media such as audio and video. RTP may operate on top of the User Datagram Protocol (UDP), which in turn may operate on top of the Internet Protocol (IP). In RTP transport, media data is encapsulated into RTP packets. Typically, each media type or media coding format has a dedicated RTP payload format.

An RTP session is an association among a group of participants communicating with RTP. It is a group communications channel which can potentially carry a number of RTP streams. An RTP stream is a stream of RTP packets comprising media data. An RTP stream is identified by an SSRC belonging to a particular RTP session. SSRC refers to either a synchronization source or a synchronization source identifier that is the 32-bit SSRC field in the RTP packet header. A synchronization source is characterized in that all packets from the synchronization source form part of the same timing and sequence number space, so a receiver device may group packets by synchronization source for playback. Examples of synchronization sources include the sender of a stream of packets derived from a signal source such as a microphone or a camera, or an RTP mixer. Each RTP stream is identified by a SSRC that is unique within the RTP session.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Figure 5A:
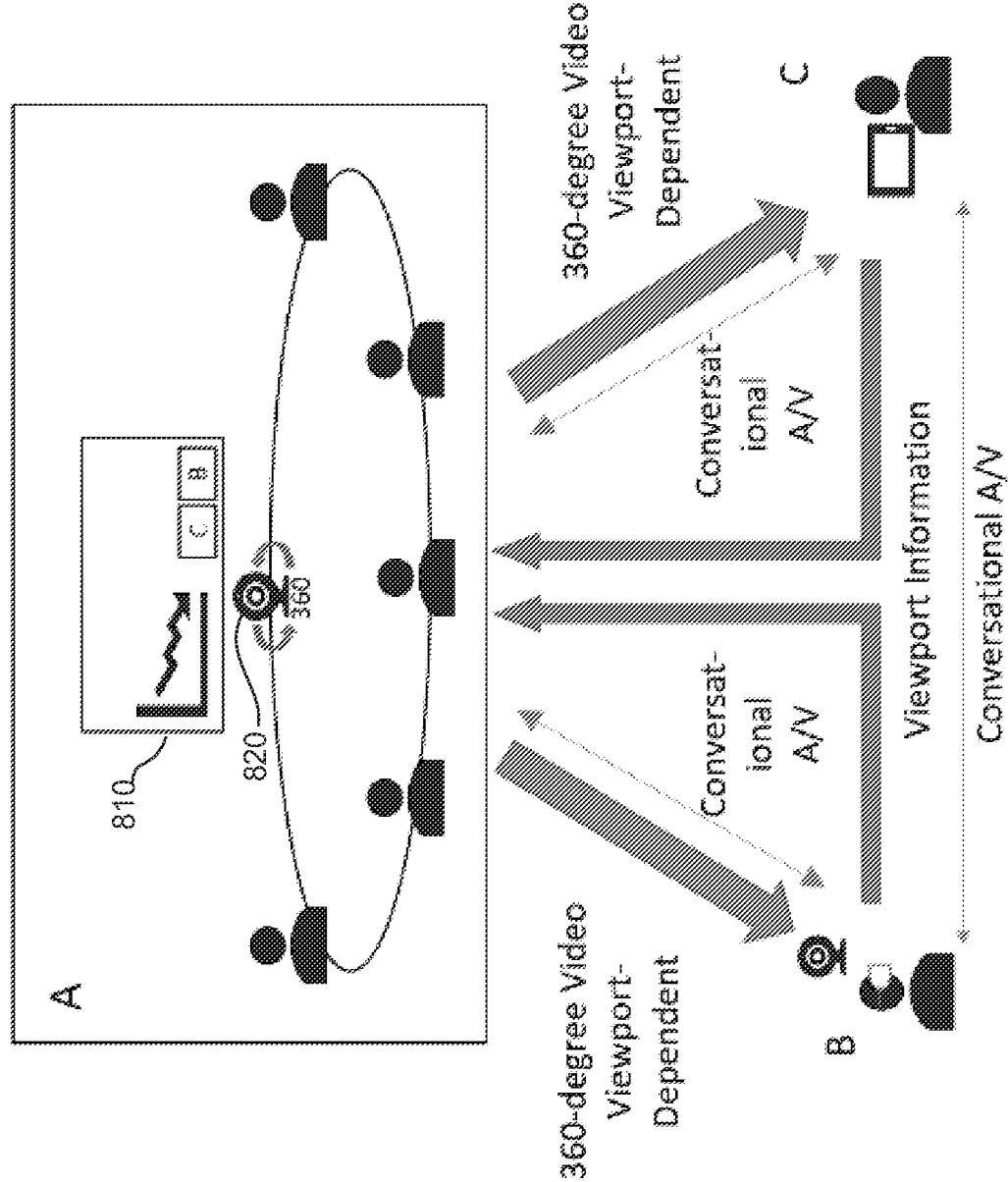
FIGS. 5*a*-5*c* show examples of a conference room with some participants.
Figure 5B:
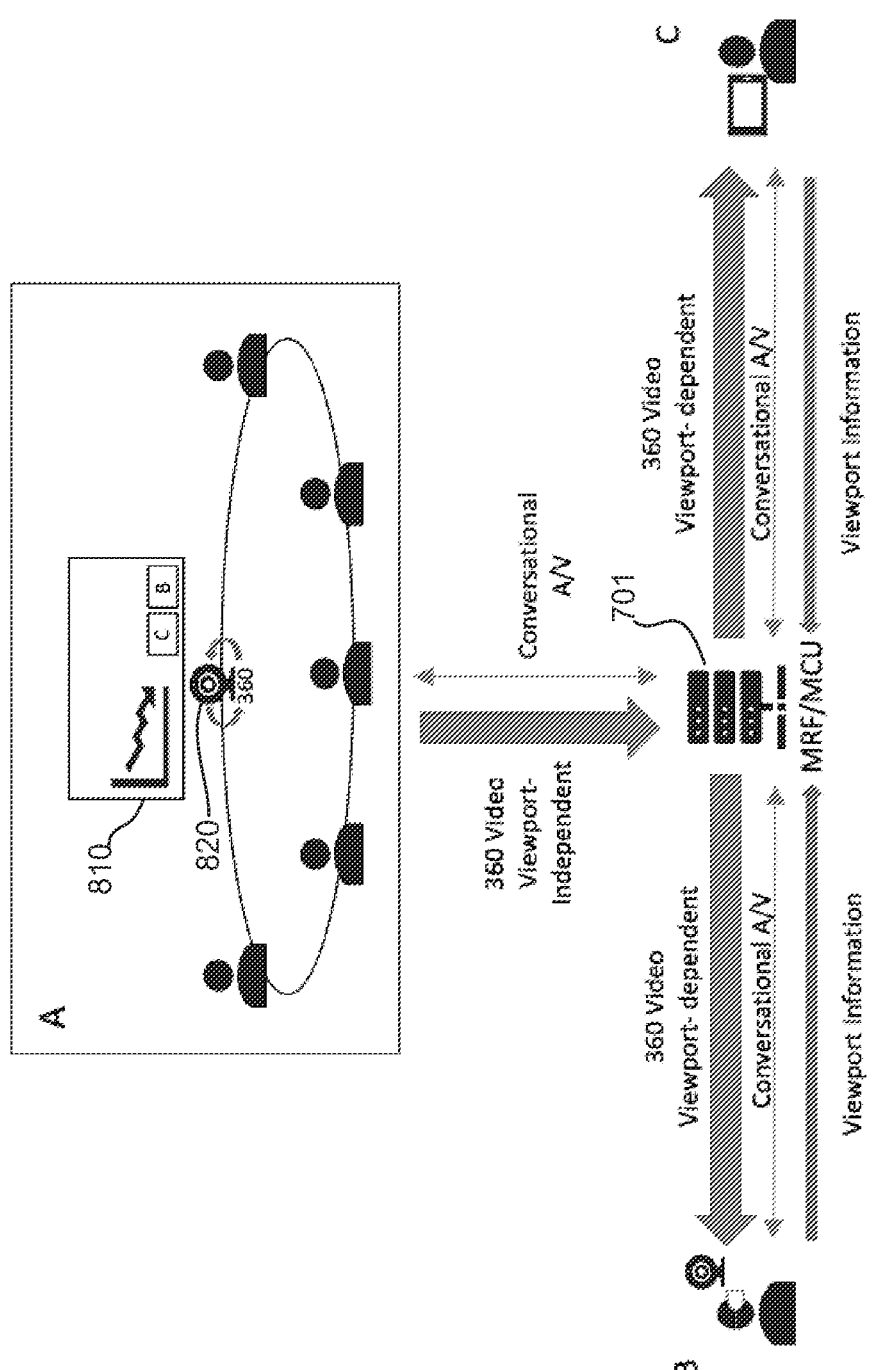
Figure 5C:
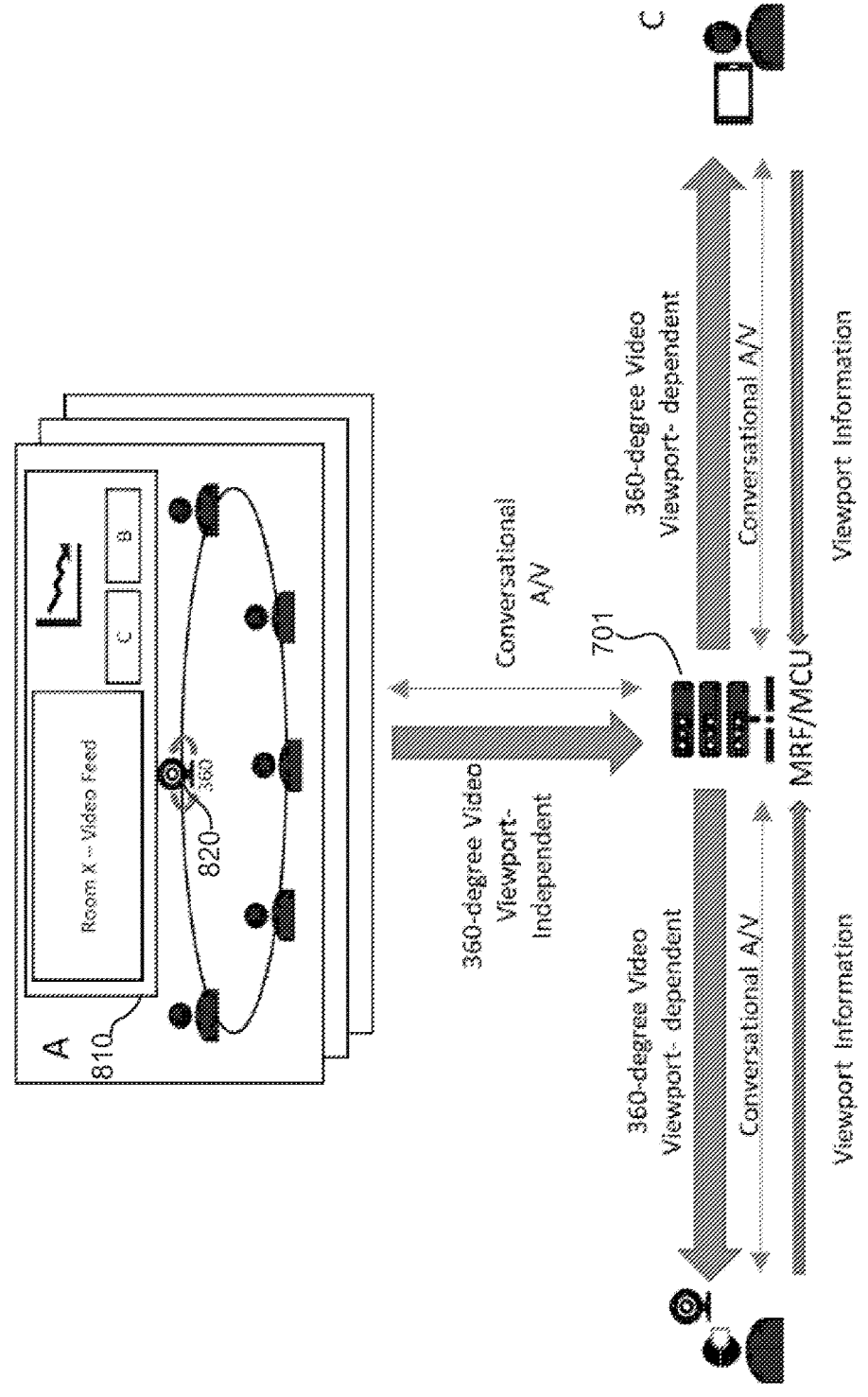

In the following, embodiments for a 360-degree event, such as a 360-degree conference, teleconference, telepresence, are discussed. However as was mentioned, in addition to the 360-degree conference, the embodiments are suitable for other delivery solutions, as well. FIGS. 5a-5c represent various scenarios for a 360-degree teleconference. A 360-degree conference can be a live meeting which is delivered to a receiver device(s) by the sender, wherein the sender is a video source, such as a 360-degree (i.e. omnidirectional) camera, or a system being operatively connected to a video source or comprising means to capture video. The streamable content from the sender to the receiver comprises at least video or audio. The purpose of the sender is to deliver video being captured forward to receiver device(s). The sender may also comprise means for receiving at least audio data from receiver device(s), and output the received audio data to the participants of the event.

In FIGS. 5a-5c a group of participants is having a meeting in a conference room. The conference room can be considered as a virtual conference system A with physical elements (i.e., camera 220, view screen 210, physical participants) being able to share content to and to receive data from remote participants. According to an example, the virtual conference system A may comprise a 360-degree (i.e., omnidirectional) camera 220 and a view screen 210. The meeting is also participated by two remote participants B, C through a conference call. Physical participants of the virtual conference system A use the view screen 210 to display a shared presentation and/or video streams coming from the remote participants B, C. One of the remote participants B is using a head mounted display for having a 360-degree view to conference content and a camera that captures his/her video. One of the remote participants C uses a mobile phone to access the conference. The mobile phone is able to show a 360-degree video on the conference and to capture his/her video.

In the example of FIG. 5a, the conference call is set up without any media-aware network elements. Both remote participants B, C send information about their viewport to the virtual conference system A, which in turn sends them a viewport-dependent video stream from the 360-degree camera 220.

In the example of FIG. 5b, the conference call is set up using a network function, which may be performed by media function such as a Media Resource Function (MRF) or a Media Control Unit (MCU) 801. The virtual conference system for multiple conference rooms X are sending 360-degree video to an MRF/MCU 801. The rooms may choose to receive 2D video streams from other participants including one of the other rooms, which is displayed on the view screen 210 in the room. The remote participants B, C can choose to view any one or none of the available 360-degree videos from the multiple rooms. Switching from one room to another may be triggered manually, or using other mechanisms, such as viewing direction or dominant speaker. The MRF/MCU 801 may signal to pause the receiving 360-degree video from any of the rooms that do not currently have any active viewers.

In the example of FIG. 5c, a virtual conference system for multiple conference rooms X are sending 360-degree video to an MRF/MCU 801. The rooms may choose to receive 2D video streams from other participants including one of the other rooms, which is displayed on the view screen 810 in the room. The remote participants B, C can choose to view any one or none of the available 360-degree videos from the multiple rooms. Switching from one room to another may be triggered manually, or using other mechanisms, such as viewing direction or dominant speaker. The MRF/MCU 801 may signal to pause the receiving 360-degree video from any of the rooms that do not currently have any active viewers.

In some embodiments, the 360-degree conference can be completely virtual, where all the meeting participants are remote participants, i.e. receiver devices connecting to the conference via a network, and where the sender is a computer generating a virtual representation of the virtual conference and the remote participants.

Figure 6:
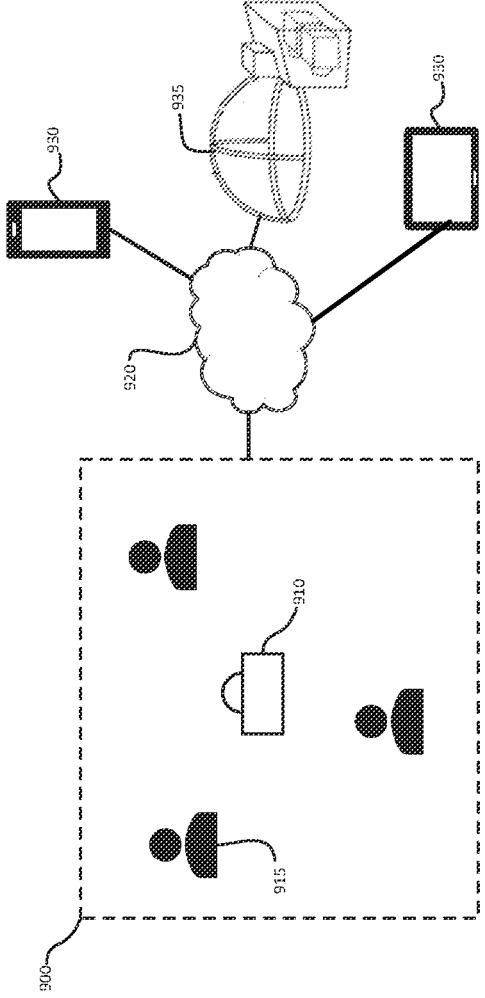
FIG. 6 shows an example of a teleconference setup.

FIG. 6 illustrates a further example of a set-up for 360-degree conference 900. In this example, a 360-degree conference 900 comprises at least one sender, such as a 360-degree video system 910 recording the conference. In addition, the 360-degree conference 900 comprises not only the live participants 915, but also one or more remote participants with receiver devices 930, 935 "participating" the conference by establishing a connection e.g. via a network 920 to the conference system which makes it possible to watch the 360-degree video captured by the 360-degree video system 910. In the following, the devices 930, 935 of the remote participants are referred to as "receiver devices" to emphasize their role as a receiving party for the streamed content. It is however appreciated that the receiver devices 930, 935 are also able to send data, for example audio.

The receiver devices 930, 935 can be virtual reality display systems, such as head mounted displays 935, but alternatively also (or in addition) displays 930 capable of showing only two-dimensional (2D) content.

Head mounted display is a device capable of showing three-dimensional (3D) content. For that purpose, a head mounted display may comprise two screen sections or two screens for displaying images for left and right eyes. The displays are close to the eyes, and therefore lenses are used to make the images easily viewable and for spreading the images to cover as much as possible of the eyes' field of view. The HMD is attached to the head of the user so that it stays in place even when the user turns his head. The device may have an orientation detecting module for determining the head movements and direction of the head. The head mounted display gives a three-dimensional (3D) perception of the recorded/streamed content to a user. The user of the head mounted display sees, at a given time instant, only a portion of 360-degree content, referred to as viewport, the size of which is being defined by the vertical and horizontal field-of-views of the HMD. Most of the audio objects of the immersive content may be visible in the viewport, while some audio objects may reside behind the user, therefore being non-visible in the viewport. As mentioned, viewport is a portion of 360-degree content. Therefore, "viewport" is a term for defining a region of omnidirectional image or video suitable for display and viewing by the user, and is defined as the part of the spherical video that is currently displayed and hence is viewable by the user(s).

In FIG. 6, the sender is illustrated as a 360-degree video system 910. It is appreciated, that instead of the 360-degree video system 910, the sender may be one of the conference participants sharing a 360-degree video, or the sender may be a middlebox or a network appliance, i.e. any computer networking device capable of media distribution. Examples of such middlebox are media gateway, conference server etc. The sender may be also a streaming server configured to deliver the content via the MPEG DASH protocol. Depending on the capabilities of the sender, it may offer viewport-independent or viewport-dependent delivery. Furthermore, if viewport-dependent delivery is offered, the control signals for determining the viewport need to be delivered from the head mounted display, or other device able to display 360-degree content, to the sender.

The viewport can be determined based on head and body movements of the user of the receiver device, such as the HMD 935. The viewport may be sent from the receiver device 935 via control channel to the sender, such as the 360-degree video system 910. Based on the received viewport, the sender is able to send video content relating to the determined viewport. It is appreciated that viewport control from means other than own movements of HMD users can cause motion sickness for the viewers.

For determining the viewport, a conferencing system (comprising both sender and receiver) may support 3 DoF. A system supporting 3 DoF allows rotational head motion around yaw, pitch and roll. In another embodiment, 6 DoF (6 Degrees of Freedom) motion may be supported. 6 DoF allows further translational head or body movements, in addition to the rotational movements, e.g., translationally moving head or body up, down, right, left, forwards and backwards, including walking around a space in any direction. 6 DoF motion may be constrained to a defined space within which the user can move around (e.g., 3 DoF+) or unconstrained.

The conference session may be established using session protocols, e.g. SDP (Session Description Protocol) and SIP (Session Initiation Protocol). The media streams may be carried using real-time transport protocols with media control protocols, e.g. RTP, RTCP (Real-time Control Protocol), SCTP (Stream Control Transmission Protocol), etc. In RTP transmission of omnidirectional video, RTCP (or RTP in the backward direction) may also be employed to convey viewport information to the sender. In practice, the HMD orientation is signaled to the sender, such that the sender can deliver the stream with the new viewport.

Transmission of RTCP viewport information may occur at constant rate or event-based. At constant rate, the viewport information may be sent e.g. every X milliseconds to the sender, irrespective of the head motion. At event-based, the sending of the viewport information may be triggered by the "head motion" event. ITT4RT (Immersive Teleconferencing and Telepresence for Remote Terminals) implementations may benefit from a mix of both approaches.

Viewport dependent delivery of omnidirectional video content in conversational or low latency delivery may be optimized between continuity of experience, while satisfying the following two criteria:

delivering content to account for head motion;

efficient bandwidth utilization.

The latter part, i.e. bandwidth utilization is directly impacted by the amount of content delivered to account for head motion.

There is an implicit assumption that the sender device (sender UE, sender user equipment) will modify the content delivery to the receiver device (receiver UE, sender user equipment) in a manner which satisfies the two criteria defined above. In an implementation of this disclosure, the parameters which define the sender UE behaviour as a response to a change in viewport orientation is described.

These parameters impact the spatial change frequency of encoding high quality content for the viewport as well as the margins.

FIG. 3*b* shows the viewport 301 and margin areas (m-region) 303 and a margin update threshold (t-region) 305, in accordance with an example of the disclosure in an equirectangular projected picture 306. The margin area 303 may also be used for stabilizing the viewport 301 when the receiving user is following the viewport orientation of another user, or when the receiving user is performing small head motion perturbations.

In case of viewport-locked viewport dependent delivery, the sender UE may be required to change the high quality encoded region continuously according to a change in viewport orientation. This is an extreme case where there is no additional content delivered to account for potential head motion. In case of sphere-locked viewport dependent delivery, there is a possibility to use margins indicated by one or more margin attribute parameters. The one or more margin attribute parameters may comprise a common value for each margin around the viewport or there may be separate values for margins at each side of the viewport (top, bottom, left, right) or the top and bottom margins may be the same and the left and right margins may be the same (but different from the top and bottom margins). In the sphere-locked viewport dependent delivery (SL-VDD), the amount of margin(s) defines the additional content delivered to account for potential head motion. Thus, for SL-VDD scenario, the sender UE may be able to respond with a change in the HQ encoded region only when there is a risk of viewport breaching the region defined by the current viewport+ margins.

In the following, some margin related parameters, which define when the sender UE is expected to respond by changing the high quality encoded region, are described.

In the following example, the margin related parameters comprise two parameters called as a margin parameter m and a margin update threshold parameter t (also called as a margin_update_threshold parameter in this disclosure).

The margin parameter m refers to a cumulative size of the viewport and margin e.g. in percentage points. The cumulative size of the viewport and the margins region (referred to as an m-region) may be obtained in the following manner: (1.0+m/100)*(viewport_size) in which m is expressed as a percentage value. In other words, the cumulative size provided by this equation is m percents greater than the actual viewport size.

The margin update threshold parameter t refers to the margin update threshold which describes a region within the margin area which may be used to determine whether a change in the high quality region should occur. In accordance with an embodiment, if movement of the viewport causes that an edge of the viewport reaches the margin update threshold it results in the change in the high quality region (including the corresponding update to the margins).

The change can occur such that the new high quality margin region is centered around the latest viewport orientation. In some embodiments, the high quality margin region can also be off-center with bias towards the viewport change direction. On the other hand, if the movement of the viewport is less than the margin update threshold i.e. the viewport stays within the margin update threshold, the sending UE may not change the high quality region. The viewport and margins region (referred to as the t-region) beyond which there is change in HQ region can be calculated in the following manner: (1.0+t/100)*(viewport_size).

The margin update threshold parameter t specifies the value(s) around a current viewport within which changes of viewport orientation do not result a change in the high quality region. In other words, if the viewport orientation changes so that the new viewport breaches the limit outside the current viewport and defined by the margin update threshold parameter at some location, it results in the change in the HQ encoded region in the viewport dependent delivery.

From the above it can be deduced that the value of the update threshold parameter t should be greater than or equal to 0 and should not be greater that the value of the margin parameter m i.e. $0 \leq t \leq m$.

FIG. 4 gives as a flow diagram an overview of the sender UE behavior based on margin_update_threshold, in accordance with an embodiment of the disclosure.

In 401 the sender UE receives at time T1+ΔT a current viewport orientation VO1 of the receiver UE at time T1 and the viewport size from the receiver UE. In 402 the sender UE receives margin information and in 403 the margin update threshold information from the receiver UE. The margin information may be received as an RTCP feedback or margin information may have been agreed during session negotiation. Also the margin update threshold may be received as an RTCP feedback or the margin update threshold may have been agreed during session negotiation. In 404 the sender UE examines if t-region is breached by the viewport at T1+ΔT. If the examination reveals that the t-region is breached by the viewport at T1+ΔT, then, at 405, the sender UE modifies the high quality region to be centered around the current or latest available viewport orientation VO1 based on the feedback of T1 received by the sender UE at T1+ΔT. However, if the examination reveals that the t-region is not breached by the viewport at T1+ΔT, then, at 406, the sender UE does not modify the high quality region (i.e. the m-region remains unchanged) and the spatial position of the viewport in the omnidirectional sphere is based on the feedback of T1 received by the sender UE at T1+ΔT.

In the following, an example for sending information of a single margin and margin update threshold parameters using SDP is illustrated:

```
m=video 49154 RTP/AVP 98 100 99
mid=100
a=tcap:1 RTP/AVPF
a=pcfg:1 t=1
b=AS:950
b=RS:0
b=RR:5000
/*omni video of room A*/
a=rtpmap:100 H265/90000
a=3gpp_360video: fov=[x=360,y=180] VDP    ERP
viewport_ctrl=device_controlled viewport=[a=100, y=90]
```

```
margin=[m=10, t=5]
a=fmtp:100 profile-id=1; level-id=93;
sprop-vps=QAEMAf//AWAAAAMAgAAAAAAAwBdLAUg;
   sprop-sps=QgEBAWAAAAMAgAAAAwAAAwBdoAKAgC0WUuS0i9AHcIBB;
   sprop-pps=RAHACYDZIA==
a=imageattr:100 send [x=7680,y=4320] recv [x=1280,y=720]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* viewport freq=30*
```

In this example, the underlined part (margin=[m=10, t=5]) include the margin parameter m=10 percent and the margin update threshold parameter t=5 percent. The use of separate t and m values (where viewport_size<t-region<m-region) results in a safety threshold via t-region to update the m-region according to the viewport orientation. In different implementation embodiments, the update threshold is specified as a fraction of the m-region to avoid the need for explicit signaling.

A value of t such that viewport_size is equal to t-region will result in a continuous update of the HQ region by the sender UE depending on the received viewport orientation (e.g., as RTCP feedback). A value of t such that t-region is equal to m-region will result in a behaviour which will result in least frequent change in HQ regions for a given viewport size and margin value. In other words, the change in HQ region (or m-region) will occur only in case the viewport breaches the m-region.

In some implementation embodiments of the disclosure, the t value can be selected based on a rate of change of viewport orientation i.e. head-motion velocity. The different t values for the corresponding viewport change velocity can be agreed in the session.

In the following, an example for sending information of a single margin and viewport movement velocity dependent margin update threshold parameters using SDP from a sender device to a receiver device is illustrated:

threshold for different velocity values. The parameter v corresponds to the velocity or angular speed of viewport change in degrees/second. For any value of v up to the specified value, the corresponding set of t values is selected. In this example, the margin m is 15 irrespective of the velocity, but the margin update threshold is 12 when the velocity is not faster than 5 degrees/second; the margin update threshold is 10 when the velocity is between 5 degrees/second and 8 degrees/second; and the margin update threshold is 8 when the velocity is over 10 degrees/second. The viewport change dependent value can be based on semantic approach of classifying angular speed into slow, medium and fast. Furthermore, the angular speed can be device dependent (e.g., different values are used for mobile devices with different resolutions). Thus, the viewport change rate parameter can be classified in a more generic manner to select the appropriate margin_update_threshold parameter. In different implementation embodiments, the viewport change parameter can be based on rate of change of viewport in pixel or resolution unit domain of the projected picture.

In the following, an example of utilization of the margin update threshold parameter will be described. A receiver UE is presenting omnidirectional video which is viewed by a user with a head mounted display. Information of orientation $VO_1$ of a current viewport displayed by the HMD at time T1 is provided to the sender UE. The sender UE encodes the

```
m=video 49154 RTP/AVP 98 100 99
mid=100
a=tcap:1 RTP/AVPF
a=pcfg:1 t=1
b=AS:950
b=RS:0
b=RR:5000
/*omni video of room A*/
a=rtpmap:100 H265/90000
a=3gpp_360video: fov=[x=360,y=180] VDP    ERP
viewport_ctrl=device_controlled viewport=[a=100,y=90]
margin=[m=15, t1=12, v1=5, t2=10, v2=8, t3=8, v3=10]
a=fmtp:100 profile-id=1; level-id=93;
sprop-vps=QAEMAf//AWAAAAMAgAAAAWAAAwBdLAUg;
   sprop-sps=QgEBAWAAAAMAgAAAAWAAAwBdoAKAgC0WUuS0i9AHcIBB;
   sprop-pps=RAHACYDZIA==
a=imageattr:100 send [x=7680,y=4320] recv [x=1280,y=720]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* viewport freq=30*
```

In the above example, the viewport size is underlined part (margin=[m=15, t1=12, v1=5, t2=10, v2=8, t3=8, v3=10]) includes the parameters for margin and the margin update viewport region and the margin region with higher quality than the background region. The receiver UE receives and decodes the viewport region and may also decode the margin region. The decoded visual information of the viewport region is displayed by the HMD. If the user moves her/his head so that the orientation of the HMD changes, information of the change, e.g. as a new viewport orientation VO₂ at time T1+ΔT, is detected, for example, by the orientation detecting module of the HMD. The receiver UE sends a message containing information of the new orientation VO₂ to the sender UE, which examines whether the new orientation causes that the viewport breaches the margin update threshold (the t-region). If it happens, the sender UE changes the viewport and the margins towards the movement of the HMD so that the high quality region now covers the new viewport region and the new margin region. Also the margin update threshold region moves accordingly to correspond with the new viewport and margin region (m-region).

On the other hand, if the new orientation does not cause that the viewport breaches the margin update threshold (the t-region), the sender UE may keep the viewport, the margin update threshold region and the margins (m-region) unaltered.

In accordance with an embodiment of the disclosure, the receiver UE may determine the margin and the margin update threshold parameters and signal them to the sender UE.

In accordance with another embodiment of the disclosure, the receiver UE and the sender UE may negotiate the margin and the margin update threshold parameters. The maximum extent of the margins may also be negotiated. For example, a sender UE may indicate the maximum extent of the margins and a receiver UE may want to limit the maximum extent of the margin area to indicate a preference for high quality viewport.

In an embodiment, the margin update threshold parameter comprises separate horizontal and vertical threshold values, where a viewport orientation breaching either or both of the values results in the change in the HQ encoded region in the viewport dependent delivery. For example, if detected movement of the HMD is only in the horizontal direction, the horizontal threshold values may be compared with the horizontal change in the viewport and the vertical threshold value may not be used in the comparison at all, or if detected movement of the HMD is only in the vertical direction, the vertical threshold values may be compared with the vertical change in the viewport and the horizontal threshold value may not be used in the comparison at all. If detected movement of the HMD is both in the horizontal direction and vertical directions, the horizontal threshold values may be compared with the horizontal change in the viewport and the vertical threshold value may be compared with the horizontal change in the viewport. If either of these comparisons indicate that the amended orientation has reached the corresponding threshold, the new orientation may be informed to the sender UE which changes the high quality region accordingly. Furthermore, the receiver UE may adjust the viewport, the margin region and the margin update threshold regions so that the center of the viewport is at the amended orientation and the margin region and the margin update threshold regions surround the new viewport as indicated by the m and t parameters.

In an embodiment, the margin_update_threshold parameter comprises separate azimuth and elevation threshold values, where a viewport orientation breaching each of the values results in the change in the HQ encoded region in the viewport dependent delivery. Similarly to the horizontal/vertical movement example above, changes in the azimuth and/or elevation are examined against the azimuth and/or elevation threshold values and determination whether to change the high quality encoded region based on the viewport may be based on such comparisons.

In an embodiment, the margin_update_threshold is adjusted by the sender based on performance metrics collected during the present and past sessions e.g., motion to high-quality viewport update time, head motion tracking etc. In another embodiment, when the sender is one-to-many, the margin_update_threshold is set based on metrics and device characteristics of all the receivers. In an embodiment, the HQ region is updated by the sender for multiple receivers when the margin_update_threshold is exceeded by N number of receiver viewports, where N is at least 1 and at most equal to the total number of receivers. In such scenarios, the sender may signal the updated margin_update_threshold together with the RTP stream (i.e. piggy back the media data packets) or deliver it as a separate control stream.

In an embodiment, the margin_update_threshold is adjusted based on the current viewport orientation and the content. For example, the margin_update_threshold is high, i.e., the HQ region is updated closer to the edge of the margin, when the content is such that the user is less likely to turn their head farther beyond the margin area (i.e. probability of the viewport breaching the m-region is low). In a different case, margin_update_threshold is low when the content is such that the viewport is more likely to change to a region beyond the margin, e.g., based on the position of the meeting participants that are captured in the 360-degree video (i.e. probability of the viewport breaching the m-region is high). In another case, the margin_update_threshold is adjusted to low if the head moves in the direction of the dominant speaker.

In a different implementation embodiment, the receiver UE can signal the t value as RTCP feedback to the sender UE, either together with the RTCP viewport orientation feedback or as a separate feedback. The benefit of such a t value signaling is that it can be selected by the receiver UE (based on the expected head motion speed). Such a prior knowledge of head motion speed can be known for robotic surveillance scenarios.

Figure 8:
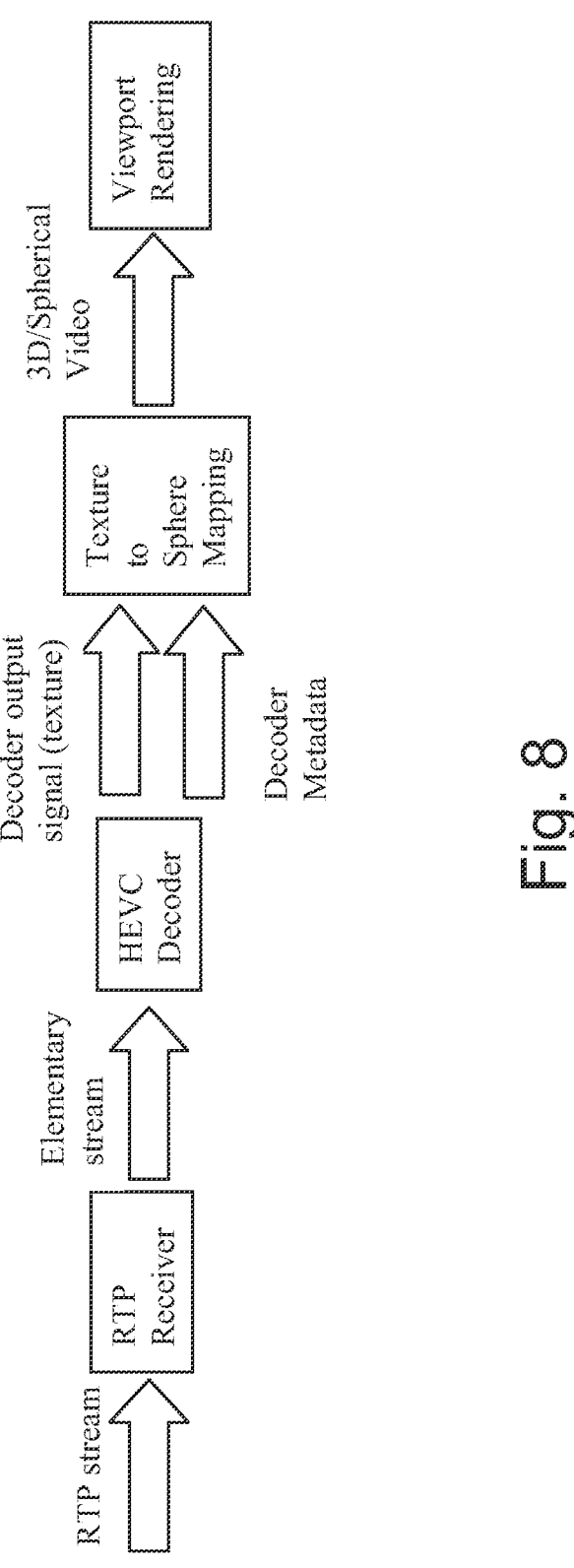
FIG. 8 shows a potential receiver architecture for VR support over MTSI and IMS Telepresence.

FIG. 8 provides an overview of a possible receiver architecture that reconstructs the spherical video in an MTSI (t Multimedia Telephony Service for Internet Protocol Multimedia Subsystem) or IMS (Internet Protocol Multimedia Subsystem) Telepresence UE. It should be noted that this Fig. does not represent an actual implementation, but a logical set of receiver functions. Based on one or more received RTP media streams, the UE parses, possibly decrypts and feeds the elementary stream to the HEVC decoder. The HEVC decoder obtains the decoder output signal, referred to as the "texture", as well as the decoder metadata. The Decoder Metadata contains the Supplemental Information Enhancement (SEI) messages, i.e., information carried in the omnidirectional video specific SEI messages, to be used in the rendering phase. In particular, the Decoder Metadata may be used by the Texture-to-Sphere Mapping function to generate a spherical video (or part thereof) based on the decoded output signal, i.e., the texture. The viewport is then generated from the spherical video signal (or part thereof) by taking into account the viewport position information from sensors, display characteristics as well as possibly other metadata such as initial viewport information. A similar receiver architecture can also be supported for the AVC codec.

For 360 degree video, some potential solutions can consider the following principles:

The RTP stream would contain an HEVC or an AVC bitstream with omnidirectional video specific SEI messages. In particular, the omnidirectional video specific SEI messages as defined in ISO/IEC 23008-2 and ISO/IEC 14496-10 may be present.

The video elementary stream(s) may be encoded following the requirements in the Omnidirectional Media Format (OMAF) specification ISO/IEC 23090-2, clause 10.1.2.2.

Relevant SEI messages contained in the elementary stream(s) with decoder rendering metadata may include the following information as per ISO/IEC 23008-2 and ISO/IEC 14496-10:

Region-wise packing information, e.g., carrying region-wise packing format indication and also any coverage restrictions Projection mapping information, indicating the projection format in use, e.g., Equirectangular projection (ERP) or Cubemap projection (CMP) Padding, indicating whether there is padding or guard band in the packed picture Frame packing arrangement, indicating the frame packing format for stereoscopic content Content pre-rotation information, indicating the amount of sphere rotation, if any, applied to the sphere signal before projection and region-wise packing at the encoder side The output signal, i.e., the decoded picture or "texture", is then rendered using the Decoder Metadata information contained in relevant SEI messages contained in the video elementary streams. The Decoder Metadata is used when performing rendering operations such as region-wise unpacking, projection de-mapping and rotation toward creating spherical content for each eye.

Viewport-dependent processing (VPD) could be supported for both point-to-point conversational sessions and multiparty conferencing scenarios and be achieved by sending from the MTSI receiver RTCP feedback or RTP header extension messages with the desired viewport information and then encoding and sending the corresponding viewport by the MTSI sender or by the media gateway, e.g., MRF. This is expected to deliver resolutions higher than the viewport independent approach for the desired viewport. The transmitted RTP stream from the MTSI sender or media gateway may also include the actual viewport or coverage information, e.g., in an RTP header extension message, as the 360 degree video generated, encoded and streamed by the sender may cover a larger area than the desired viewport. The media formats for tiling and sub-picture coding as described in the viewport-dependent profile of OMAF in ISO/IEC 23090-2 etc. are not relevant for the 5G conversational setting. Instead, viewport-dependent processing based on tiling and sub-picture coding could be realized via RTP/RTCP based protocols that are supported by MTSI and IMS-based telepresence.

OMAF video profiles specified in ISO/IEC 23090-2 are based on HEVC Main 10 Profile, Main Tier, Level 5.1 in order to deliver high quality VR experiences. In the meantime, MTSI in TS 26.114 mandates H.265 (HEVC) Main Profile, Main Tier, Level 3.1 for video, and IMS telepresence in TS 26.223 mandates H.265 (HEVC) Main Profile, Main Tier, Level 4.1 for video.

For achieving video quality required by VR services, it may be recommended that the video codecs for VR support in MTSI and IMS telepresence are aligned with OMAF and/or TS 26.118, e.g., HEVC Main 10 Profile, Main Tier, Level 5.1 may be recommended for MTSI and IMS telepresence in TS 26.114 and TS 26.223 to ensure a high-quality VR experience. It is expected that both MTSI client and MTSI gateway codec requirements are aligned with these recommended video codec requirements for VR support. It is not expected that the mechanisms for session setup and negotiation would be different because of this changed requirement on video codecs.

With regards to the negotiation of SEI messages for carriage of decoder rendering metadata, procedures specified in IETF RFC 7798 on the RTP payload format for HEVC may be reused. In particular, RFC 7798 can allow exposing SEI messages related to decoder rendering metadata for omnidirectional media in the SDP using the 'sprop-sei' parameter, which allows to convey one or more SEI messages that describe bitstream characteristics. When present, a decoder can rely on the bitstream characteristics that are described in the SEI messages for the entire duration of the session. Intentionally, RFC 7798 does not list an applicable or inapplicable SEI messages to be listed as part of this parameter, so the newly defined SEI messages for omnidirectional media in ISO/IEC 23008-2 can be signalled. It is expected that both MTSI clients and MTSI gateways support RTP payload formats for VR support.

For most one-to-one video telephony and multi-party video conferencing scenarios, it is expected that support of the following omnidirectional video specific SEI messages would be sufficient:

1) the equirectangular projection SEI message,
2) the cubemap projection SEI message,
3) the sphere rotation SEI message, and
4) the region-wise packing SEI message.

For stereoscopic video support, in either one-to-one video telephony scenarios or multi-party video conferencing scenarios, support of a subset of the frame packing arrangement SEI message as in ISO/IEC 23090-2 is also needed.

The FCI (feedback control information) format for Viewport may be as follows. The FCI may contain exactly one viewport. The signalled desired viewport information in the RTCP feedback message for 'Viewport' is composed of the following parameters (as aligned with OMAF):

Viewport_azimuth: Specifies the azimuth of the centre point of the sphere region corresponding to the desired viewport in units of $2^{-16}$ degrees relative to the global coordinate axes.

Viewport_elevation: Specifies the elevation of the centre point of the sphere region corresponding to the desired viewport in units of $2^{-16}$ degrees relative to the global coordinate axes.

Viewport_tilt: Specifies the tilt angle of the sphere region corresponding to the desired viewport, in units of $2^{-16}$ degrees, relative to the global coordinate axes.

Viewport_azimuth_range: Specifies the azimuth range of the sphere region corresponding to the desired viewport through the centre point of the sphere region in units of $2^{-16}$ degrees.

Viewport_elevation_range: Specifies the elevation range of the sphere region corresponding to the desired viewport through the centre point of the sphere region in units of $2^{-16}$ degrees.

Viewport_stereoscopic: Included if the desired viewport is indicated for stereoscopic video. Value 0 indicates monoscopic content, value 1 indicates that the sphere region is on the left view of a stereoscopic content, value 2 indicates the sphere region is on the right view of a stereoscopic content, and value 3 indicates that the sphere region is on both the left and right views.

In viewport dependent delivery, the Motion to High Quality (M2HQ) Delay is the time elapsed between the instant the user changes head orientation to a new position and the time the user receives content at high quality for the new head orientation. In order to minimize the M2HQ delay and consequently enhance the user experience, a receiver should be able to request additional margins at a higher quality around the viewport when the network conditions allow.

It should be possible to signal the extent of this margin area exactly (or as a minimum or maximum). The signaling may be done using SDP at the beginning of the session or during the session.

It may be possible for the sender to change the width of these margins during the session without receiver involvement, e.g., based on the quality of the network. However, the margin area should not exceed the maximum or be less than the minimum value set for it.

The margin area may be extended equally on all sides of the viewport or unevenly depending on i) general user behavior as determined through watching patterns ii) recent head motion signals or iii) nature of the content (e.g., room layout).

Figure 7:
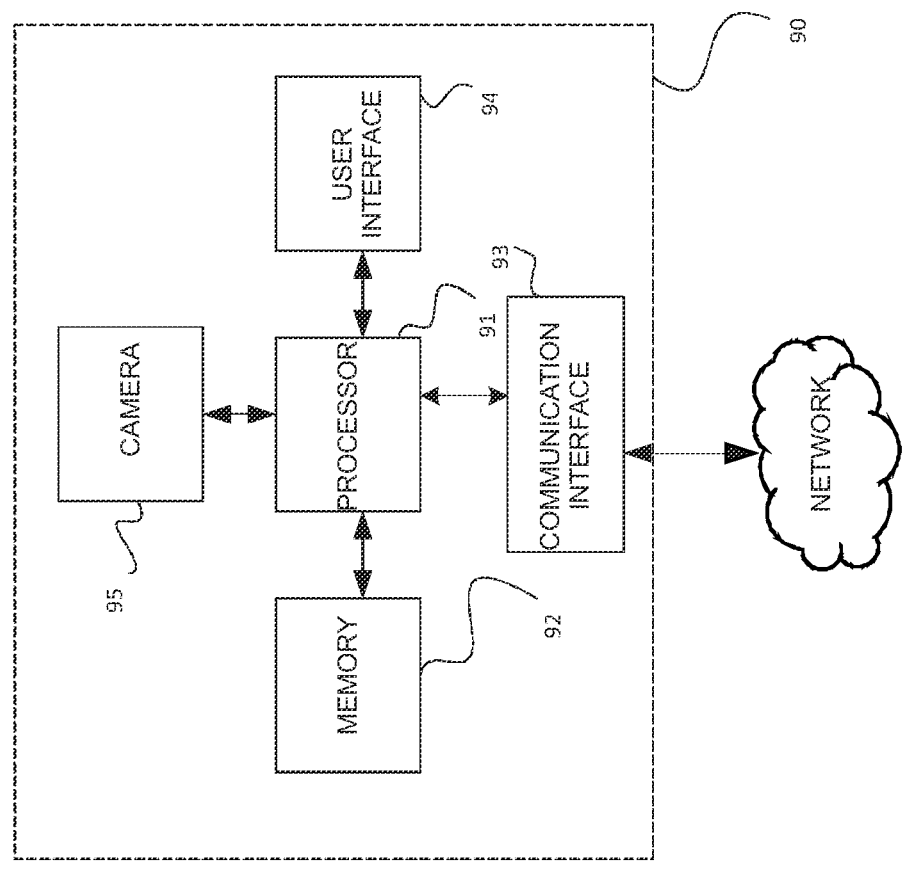
FIG. 7 shows an apparatus according to an embodiment.

An example of an apparatus is shown in FIG. 7. Several functionalities can be carried out with a single physical device, e.g. in a single processor, if desired. The apparatus 90 comprises a main processing unit 91, a memory 92, a user interface 94, a communication interface 93. The apparatus according to an embodiment, shown in FIG. 7, also comprises a camera module 95. The memory 92 stores data including computer program code in the apparatus 90. The computer program code is configured to implement the method according to flowchart of FIG. 9a as a sender device or FIG. 9b as a receiver device. The camera module 95 receives 951 input data, in the form of video stream, to be processed by the processor 91. The sender device obtains 952 information of a viewport of a receiver device, obtains 953 information of a margin region outside the viewport, and obtains 954 a margin update threshold parameter defining a threshold region within the margin region. Based on the information of the viewport and the margin update threshold parameter, the sender device determines 955 whether to change the margin region, The sender device also encodes 956 the omnidirectional video content within the viewport with a first quality, encodes 957 the omnidirectional video content within the margin region with a quality not higher than the first quality, and encodes 958 the omnidirectional video content outside the viewport and the margin region with a third quality lower than the first quality and the quality of the margin region. The receiver device receives 961 encoded omnidirectional video content for displaying, wherein the encoded omnidirectional video content comprises a viewport region encoded with a first quality, a margin region outside the first region encoded with a quality not higher than the first quality and a background region outside the margin region encoded with a quality lower than the first quality and the quality of the margin region. The receiver device obtains 962 information of a current viewport of the receiver device, obtains 963 information of a margin region outside the current viewport, and obtains 964 a margin update threshold parameter defining a threshold region within the margin region. The receiver device determines 965 whether the current viewport breaches the threshold region, and based on the determining, sends 966 information of the current viewport to the sender device.

The communication interface 93 forwards processed data for example to a display of another device, such a HMD. When the apparatus 90 is a video source comprising the camera module 95, user inputs may be received from the user interface. If the apparatus 90 is a middlebox in a network, the user interface is optional, such as the camera module.

The various embodiments may provide advantages. For example, sender behavior may be clearly specified which may make the VDD QOE consistent for the end user. Improved sender UE video encoder efficiency may also be achieved by reducing the change in HQ region. Thus, reducing the complexity for the sender UE (unlike the viewport-locked delivery where the HQ region needs to change continuously depending on the change in viewport orientation). Some embodiments may also provide seamless switching between viewport-locked and sphere-locked by simply change the margin_update_threshold.

The present embodiments enable immersive content consumption on a device, when the content is being sent over the network, for example in an omnidirectional video telephony. Thus, present embodiments are applicable in 360-degree conferencing. It is to be noted, however, that the invention is not limited to 360-degree conferencing. In fact, the different embodiments have applications in any environment, where video delivery is performed.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises obtaining information of available quality features of a sender device for providing omnidirectional visual media content; selecting one or more of the available quality features; and providing an indication of the selected one or more of the available quality features.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus comprising at least one processor and at least one memory including instructions that, when executed by the at least one processor, cause the apparatus at least to:
   receive an omnidirectional video content for encoding;
   obtain information of a viewport of a receiver device;
   obtain a margin region parameter defining a margin region surrounding the viewport;
   obtain a margin update threshold parameter defining a threshold region surrounding the viewport and contained by the margin region, wherein the margin update threshold parameter is less than the margin region parameter;
   change the margin region in response to an indication that the viewport breaches the threshold region;
   encode the omnidirectional video content within the viewport with a first quality;
   encode the omnidirectional video content within the margin region with a second quality, wherein the second quality is not higher than the first quality; and
   encode the omnidirectional video content outside the viewport and the margin region with a third quality lower than the first quality and the second quality.

2. The apparatus according to claim 1, wherein the instructions, when executed by the at least one processor, further cause the apparatus at least to:
   receive from the receiver device information of a movement of the viewport orientation; and
   change the margin region and the threshold region towards the movement of the viewport orientation.

3. The apparatus according to claim 2, wherein the instructions, when executed by the at least one processor, further cause the apparatus at least to:
   determine a current orientation of the viewport based on the information of the movement of the viewport; and
   move the margin region according to a current viewport within the margin region.

4. The apparatus according to claim 1, wherein the instructions, when executed by the at least one processor, further cause the apparatus at least to:
   negotiate with the receiver device a value for the margin update threshold parameter.

5. The apparatus according to claim 1, wherein the instructions, when executed by the at least one processor, further cause the apparatus at least to:
   receive from the receiver device a current viewport orientation and the margin update threshold parameter;
   examine the current viewport orientation and the margin update threshold parameter to determine whether the current viewport orientation exceeds the threshold region determined by a previous viewport orientation; and
   based on the examination, change the margin region using the current viewport orientation.

6. The apparatus according to claim 1, wherein the instructions, when executed by the at least one processor, further cause the apparatus at least to:
   obtain one or more viewport change rate parameters; and
   associate for each of the one or more viewport change rate parameters the margin update threshold parameter.

7. The apparatus according to claim 6, wherein the instructions, when executed by the at least one processor, further cause the apparatus at least to:
   receive information of viewport change rate from the receiver device; and adjust the margin region based on the margin update threshold parameter associated with the received viewport change rate.

8. The apparatus according to claim 6, wherein the instructions, when executed by the at least one processor, further cause the apparatus at least to:
   receive a feedback signal from the receiver device comprising information of a current viewport orientation at a time of transmission of the feedback signal; and
   based on the information of the current viewport orientation and the viewport change rate estimate a viewport orientation at the time of reception of the information of the current viewport orientation.

9. The apparatus according to claim 1, wherein the instructions, when executed by the at least one processor, further cause the apparatus at least to:
   examine contents of a current viewport; and
   based on the contents and a current viewport orientation adjust the margin update threshold parameter.

10. A method, comprising:
   receiving by a sender device an omnidirectional video content for encoding;
   obtaining information of a viewport of a receiver device;
   obtaining a margin region parameter defining a margin region surrounding the viewport;
   obtaining a margin update threshold parameter defining a threshold region surrounding the viewport and contained by the margin region, wherein the margin update threshold parameter is less than the margin region parameter;
   change the margin region in response to an indication that the viewport breaches the threshold region;
   encoding the omnidirectional video content within the viewport with a first quality;
   encoding the omnidirectional video content within the margin region with a quality not higher than the first quality; and
   encoding the omnidirectional video content outside the viewport and the margin region with a third quality lower than the first quality and the quality of the margin region.

11. An apparatus comprising at least one processor and at least one memory including instructions that, when executed by the at least one processor, cause the apparatus at least to:
   receive encoded omnidirectional video content for displaying, wherein the encoded omnidirectional video content comprises a viewport region encoded with a first quality, a margin region surrounding the viewport region encoded with a second quality not higher than the first quality and a background region surrounding the margin region encoded with a third quality that is lower than the first quality and lower than the quality of the margin region;
   obtain information of a current viewport of the receiver device;
   obtain information of a margin region outside the current viewport;
   obtain a margin update threshold parameter defining a threshold region contained by the margin region;
   in response to a determination that the current viewport breaches the threshold region, change the margin region; and
   send information of the current viewport to a sender device.

12. The apparatus according to claim 11, wherein the instructions, when executed by the at least one processor, further cause the apparatus at least to:

transmit to the sender device information of a movement of the viewport orientation.

13. The apparatus according to claim 11, wherein the instructions, when executed by the at least one processor, further cause the apparatus at least to:

negotiate with the sender device a value for the margin update threshold parameter.

14. The apparatus according to claim 11, wherein the instructions, when executed by the at least one processor, further cause the apparatus at least to:

transmit the margin update threshold parameter in addition to a current viewport orientation.

15. A method, comprising:

receiving by a receiver device encoded omnidirectional video content for displaying, wherein the encoded omnidirectional video content comprises a viewport region encoded with a first quality, a margin region surrounding the viewport region encoded with a second quality not higher than the first quality and a background region surrounding the margin region encoded with a third quality that is lower than the first quality and lower than the quality of the margin region;

obtaining information of a current viewport of the receiver device;

obtaining information of the margin region surrounding the viewport region;

obtaining a margin update threshold parameter defining a threshold region contained by the margin region;

in response to a determination that the viewport region breaches the threshold region, changing the margin region; and sending information of the viewport region to a sender device.

16. The method according to claim 15, further comprising:

transmitting to the sender device information of a movement of an orientation of the viewport region.

17. The method according to claim 15, further comprising:

negotiating with the sender device a value for the margin update threshold parameter.

18. The method according to claim 15, further comprising:

transmitting the margin update threshold parameter in addition to a current viewport orientation.

19. The method according to claim 10, comprising:

receiving from the receiver device information of a movement of the viewport orientation; and changing the margin region and the threshold region towards the movement of the viewport orientation.

20. The method according to claim 10, further comprising:

determining a current orientation of the viewport based on the information of the movement of the viewport; and moving the margin region according to a current viewport within the margin region.

* * * * *